Nov. 8, 1960 S. CROSBY 2,958,988
TOOL GRINDING MACHINE
Filed Dec. 26, 1957 9 Sheets-Sheet 1
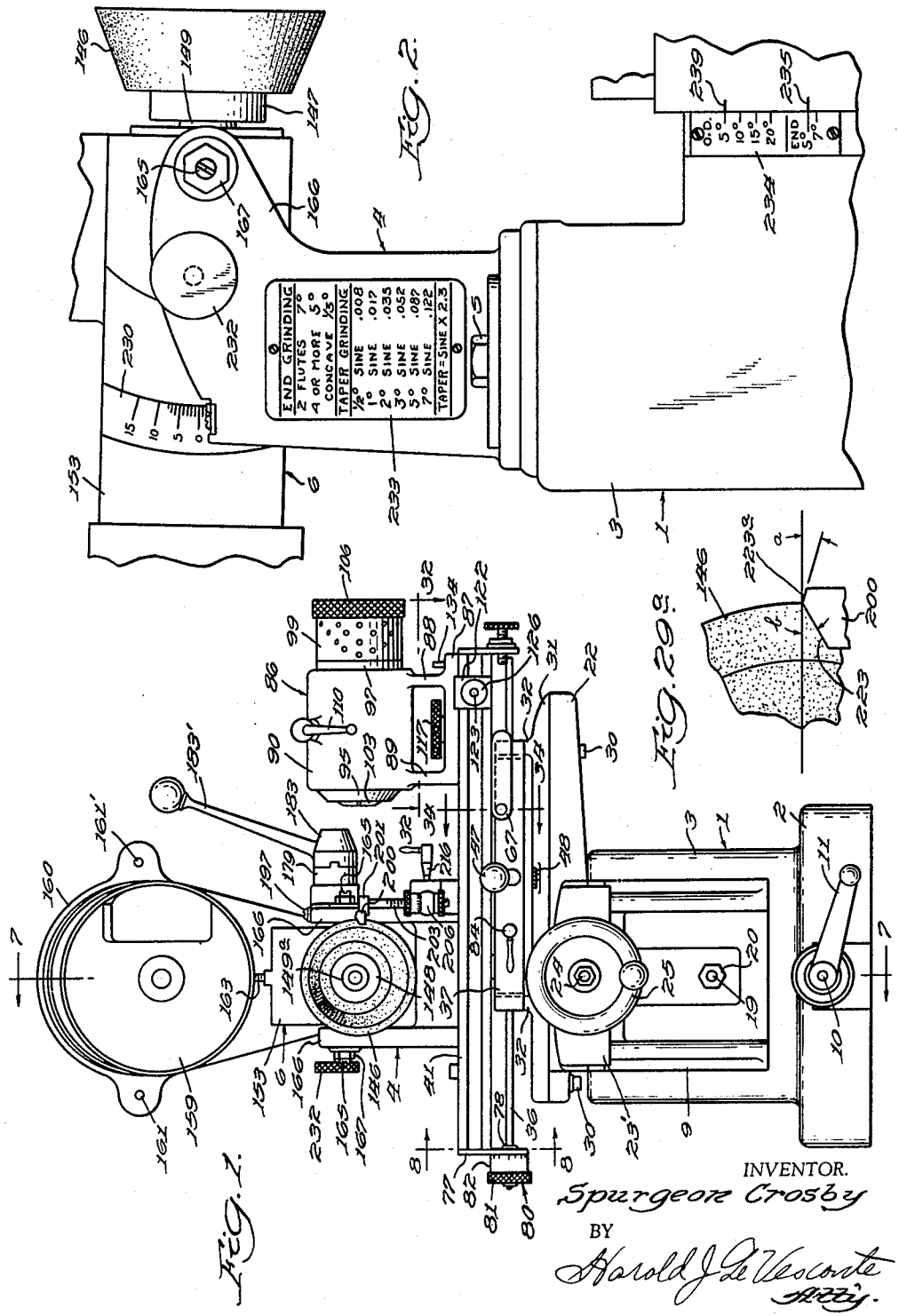
INVENTOR.
Spurgeon Crosby
BY
Harold J. LeVesconte
Atty.

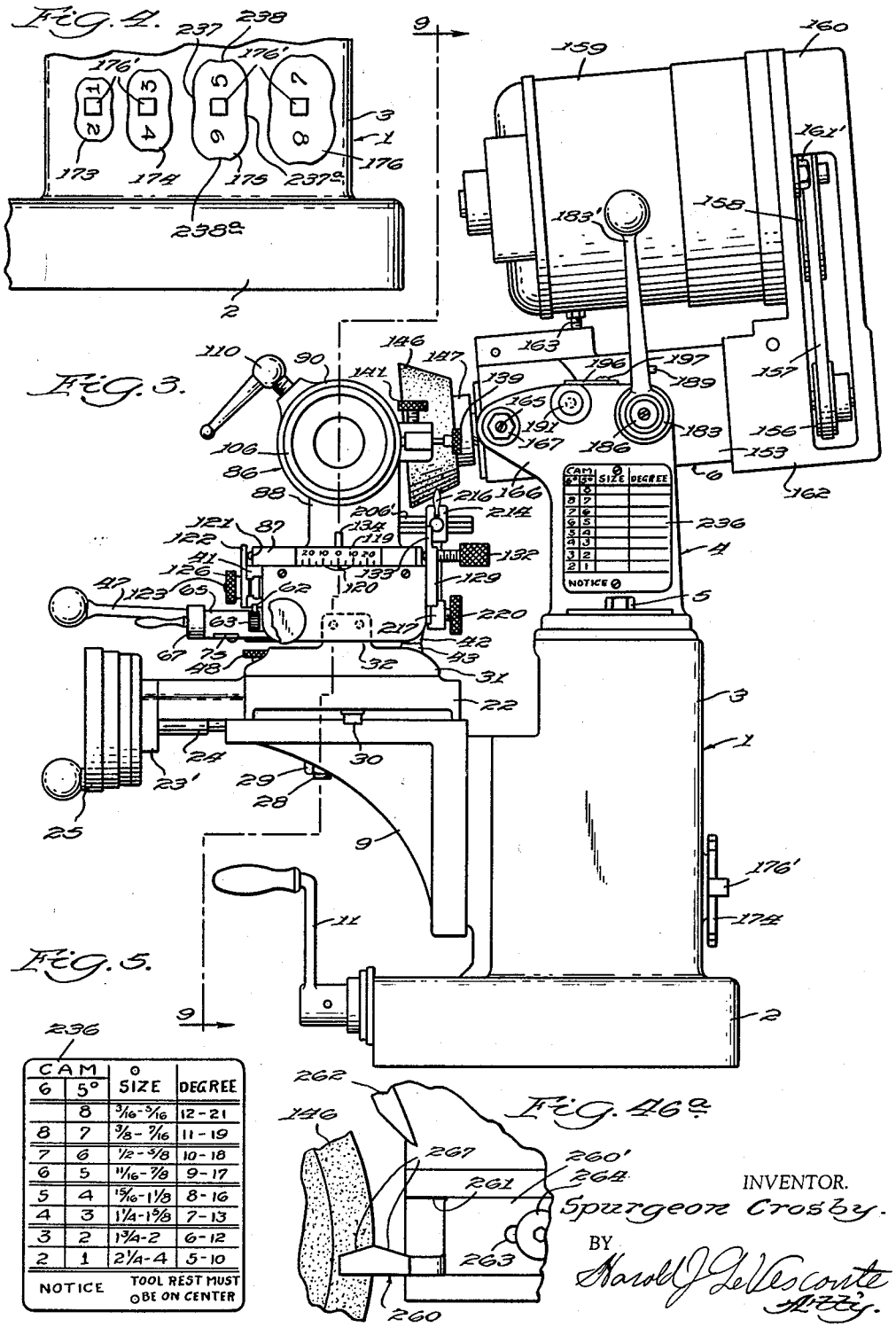

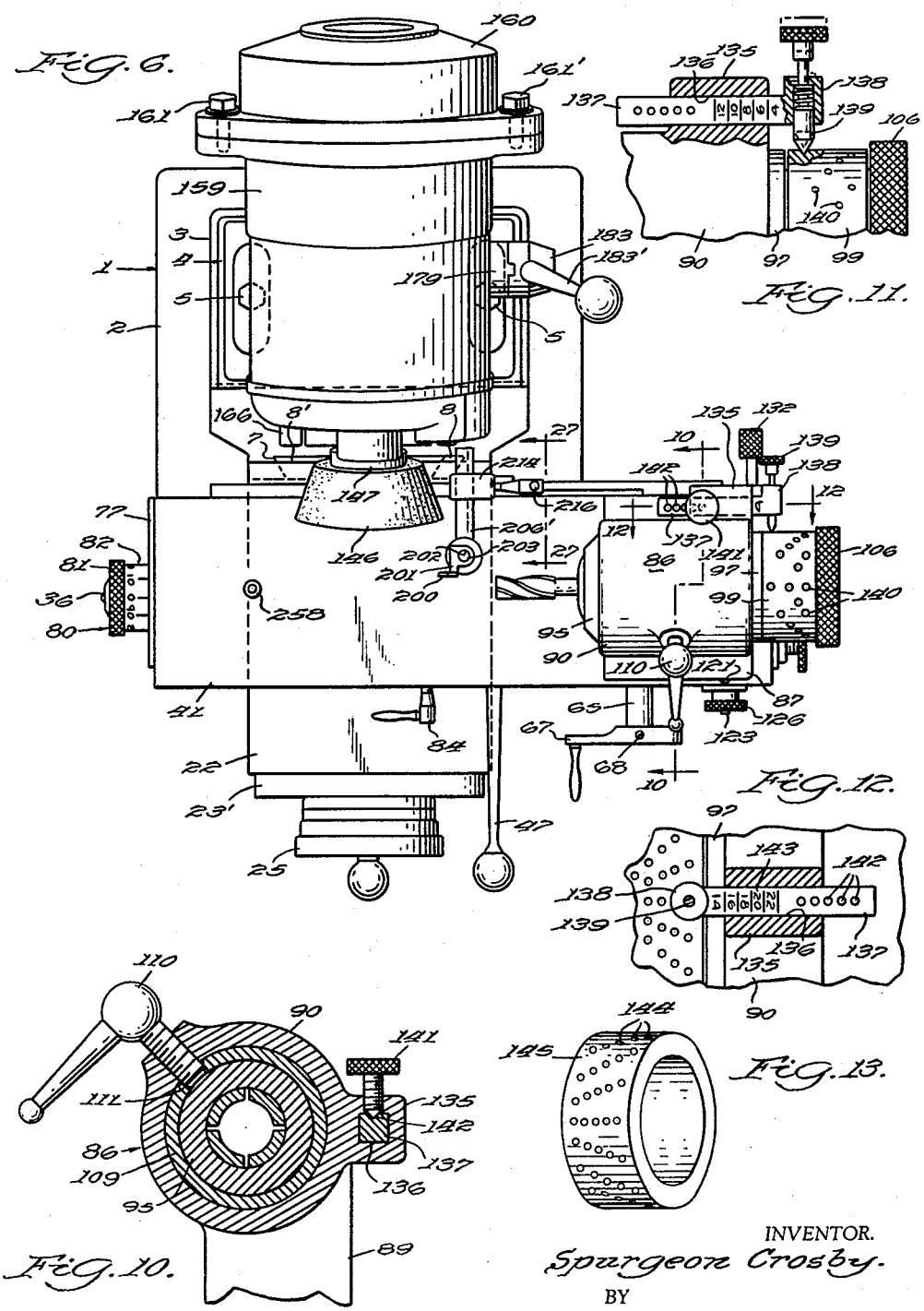

Nov. 8, 1960 S. CROSBY 2,958,988
TOOL GRINDING MACHINE
Filed Dec. 26, 1957 9 Sheets-Sheet 4
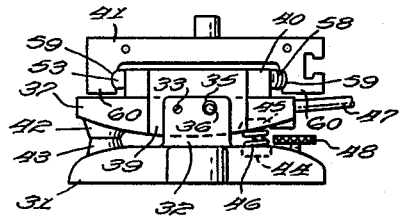
Fig. 8.
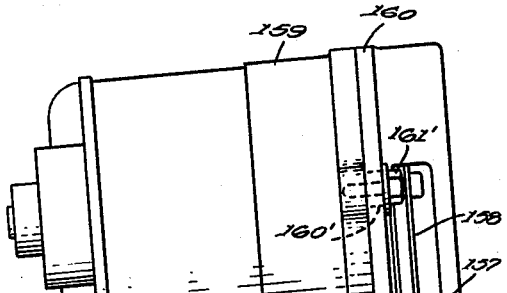
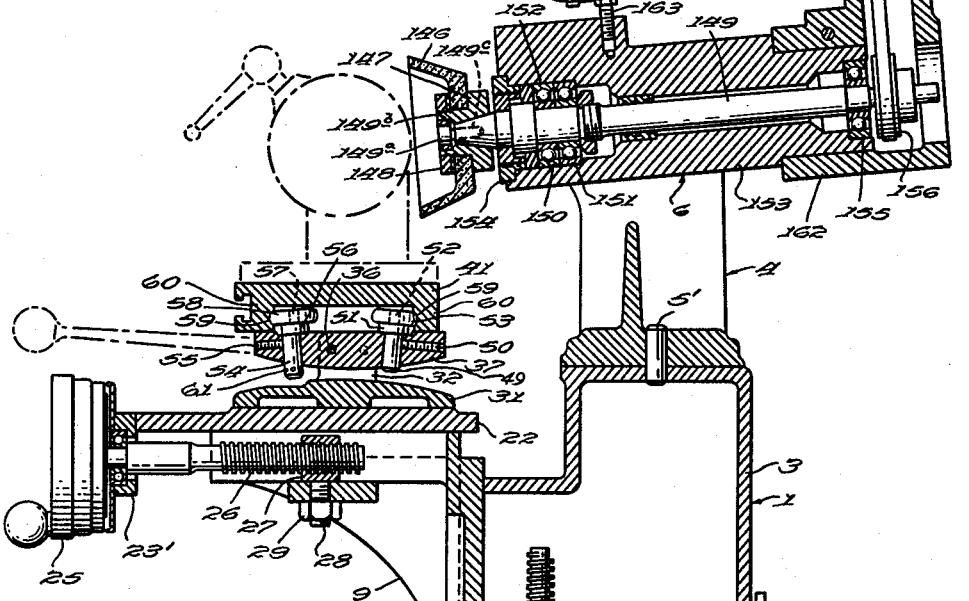
Fig. 7.
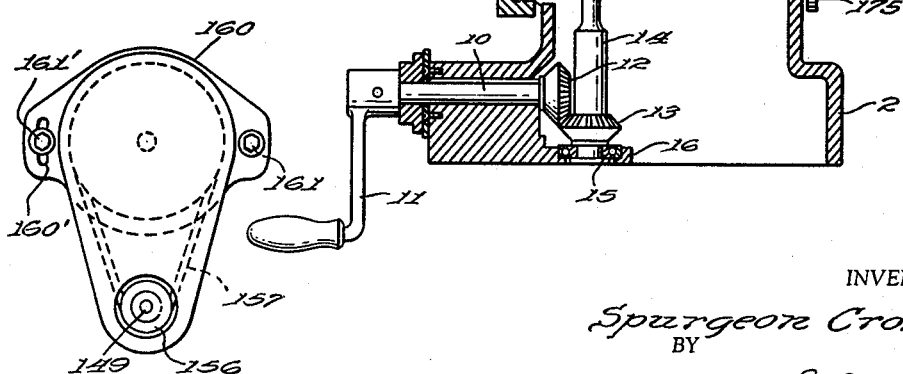
Fig. 7ª.
INVENTOR.
Spurgeon Crosby.
BY
Harold J. DeVeconte
Atty.

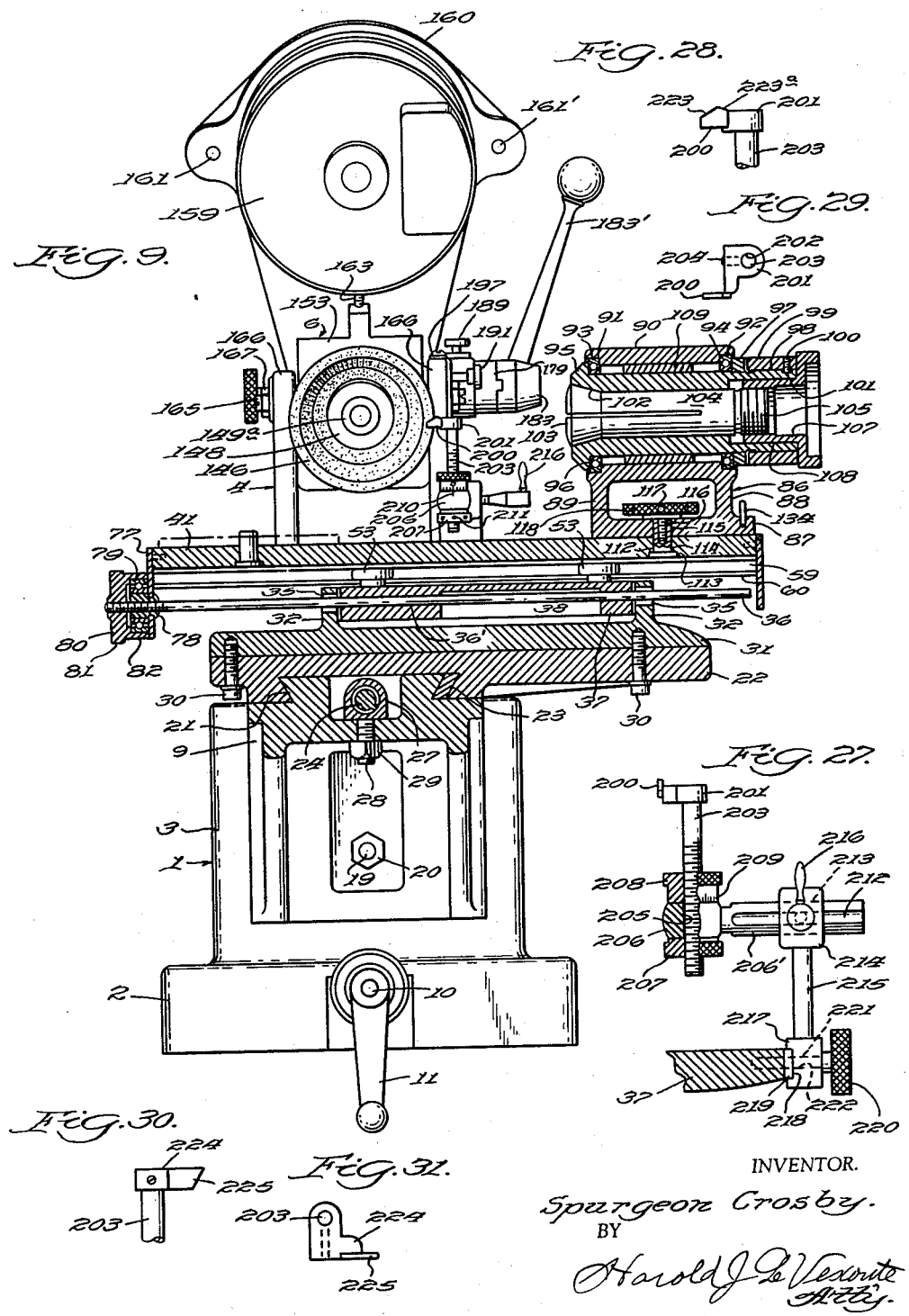

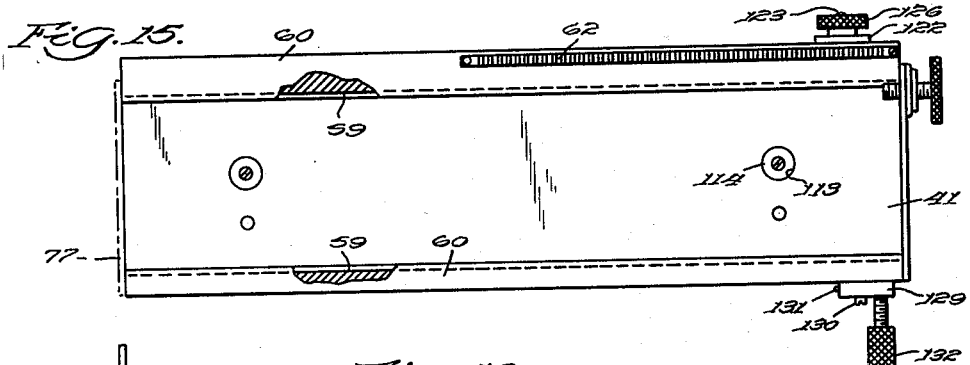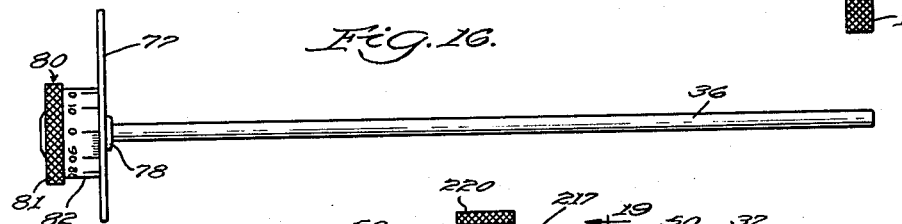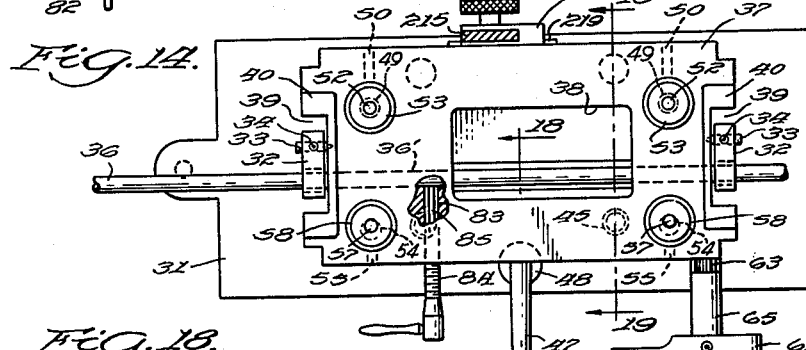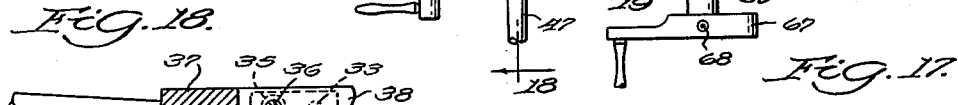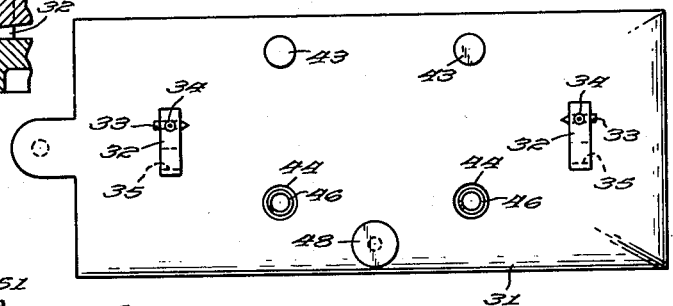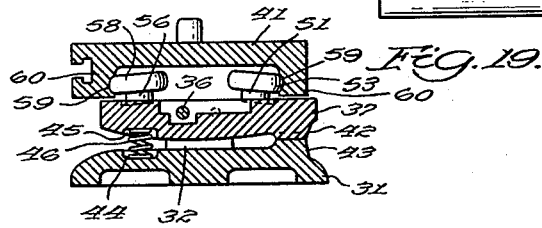

Nov. 8, 1960
S. CROSBY
2,958,988
TOOL GRINDING MACHINE
Filed Dec. 26, 1957
9 Sheets-Sheet 7
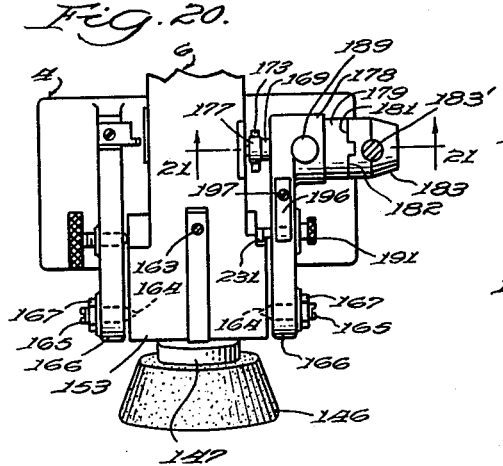
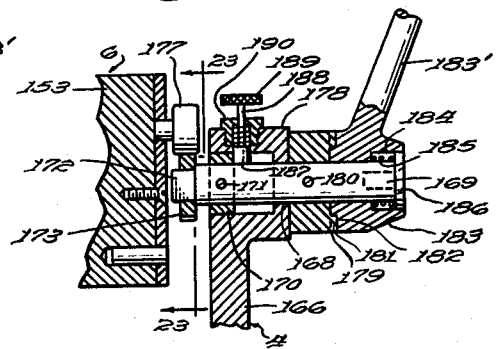
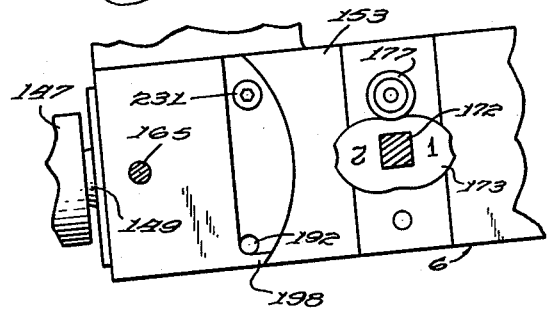
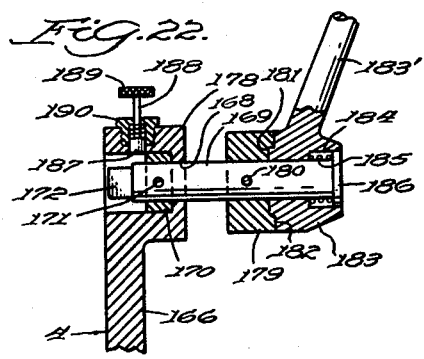
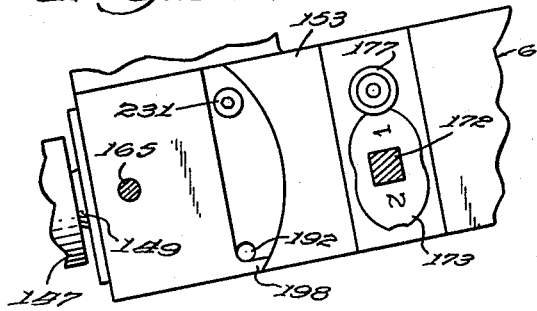
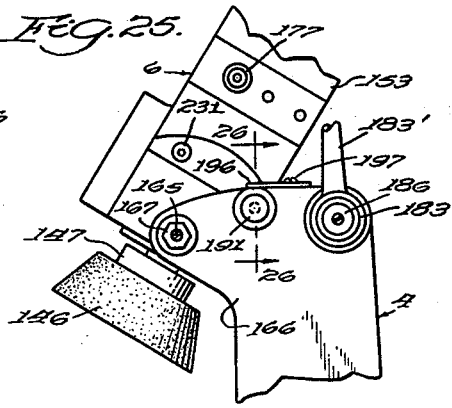
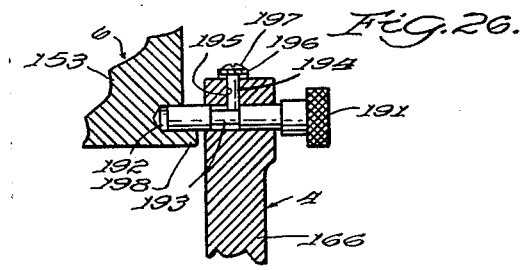
INVENTOR.
Spurgeon Crosby.
BY
Harold J. LeVisconte
Atty.

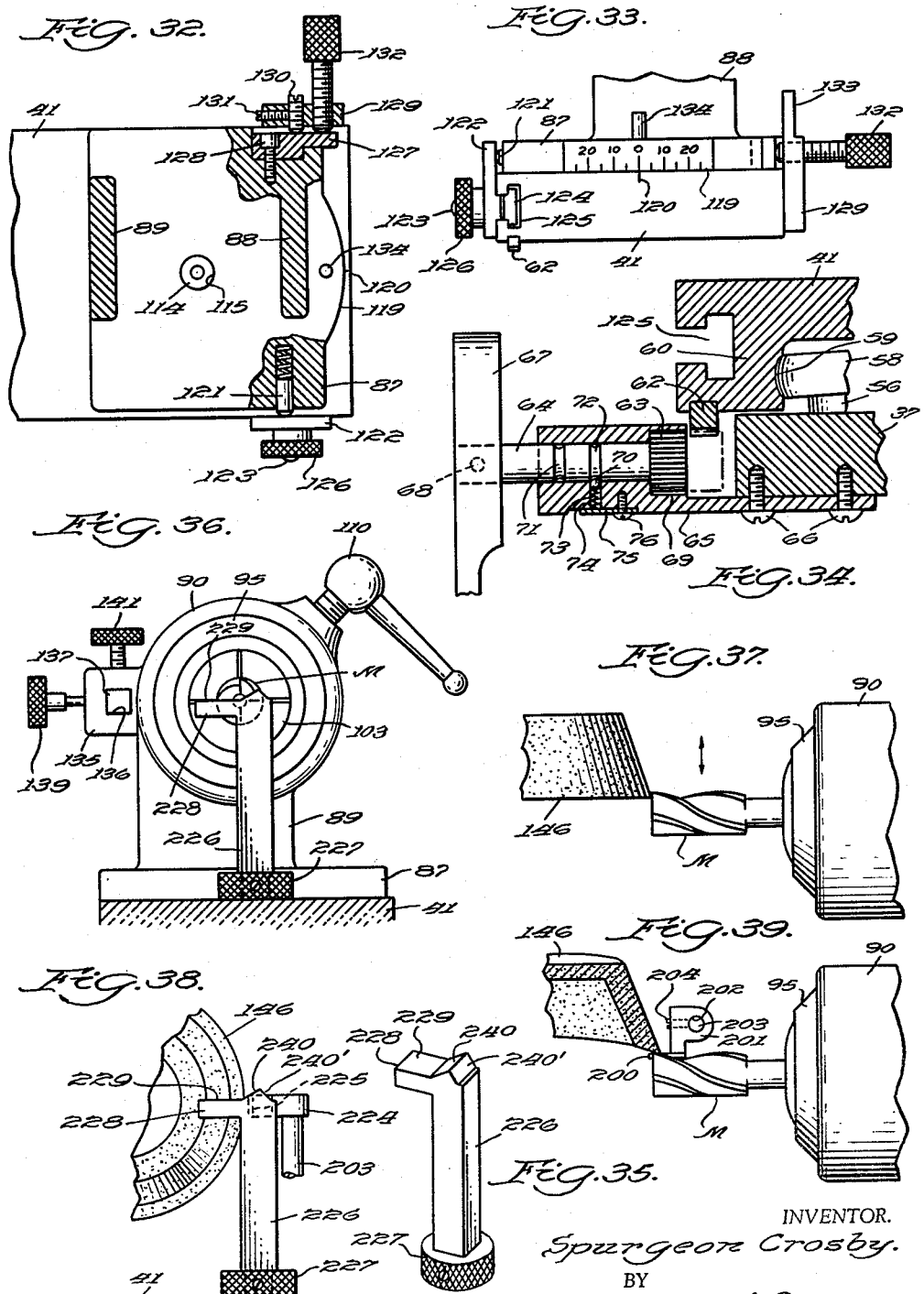

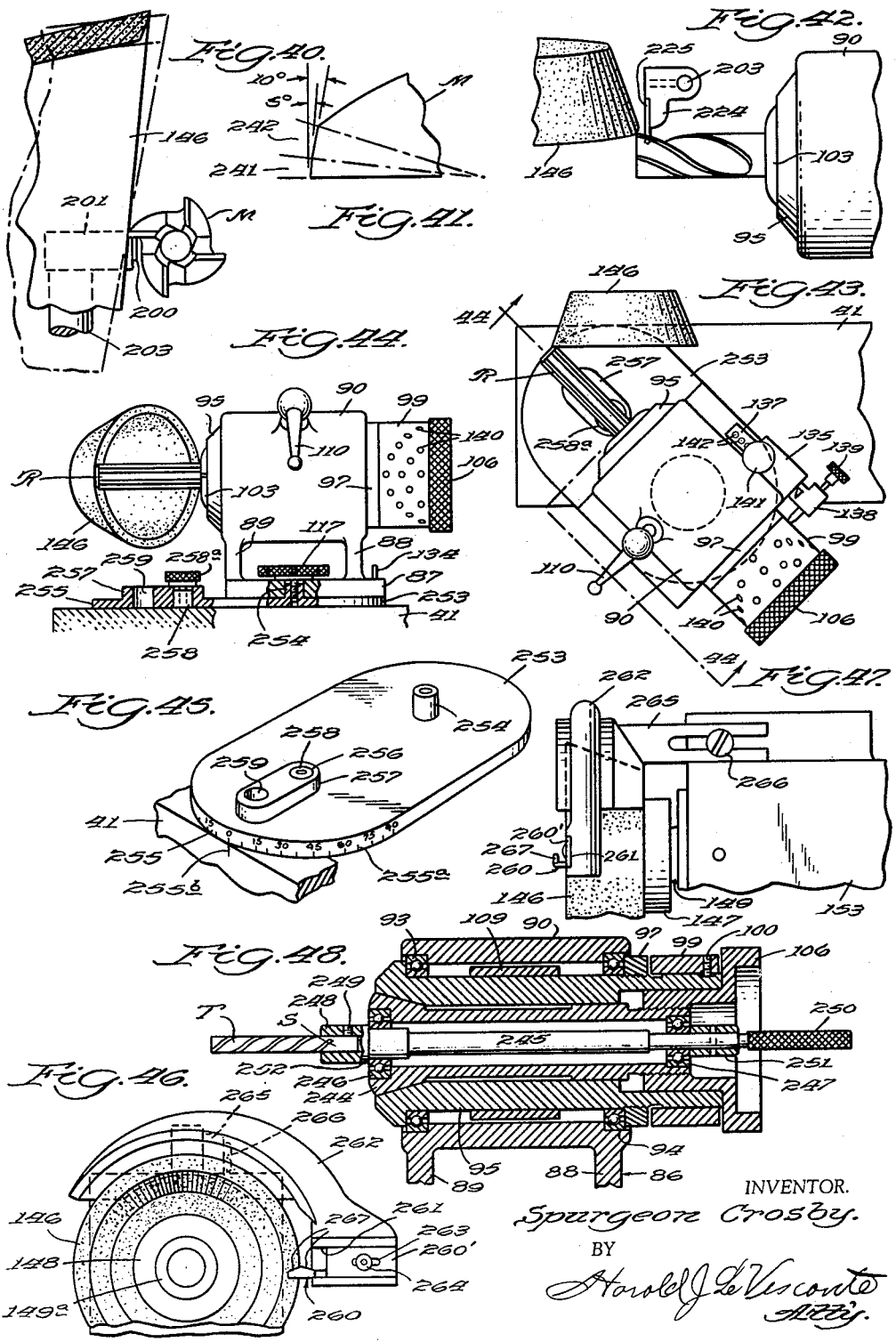

United States Patent Office 2,958,988
Patented Nov. 8, 1960

2,958,988
TOOL GRINDING MACHINE
Spurgeon Crosby, 4916 San Fernando Road, Glendale 4, Calif.
Filed Dec. 26, 1957, Ser. No. 705,422
35 Claims. (Cl. 51—122)

This invention relates to tool grinding machines and more particularly to a machine for grinding toothed cutters such as milling cutters, end mills, reamers, and the like.

Heretofore the grinding of such tools has involved the making of calculations according to established formulas taking into consideration the diameter of the cutter, the desired angle of the relief or clearance to be ground. Where, as is usually the case, two clearance angles are to be formed, this calculation must be repeated. Obviously, this not only requires more than ordinary skill, but also the chances for error are present both in making calculations and in setting the machine according to the values resulting from the calculations and which errors may result either in shortening the life of the tool or damaging the work on which the incorrectly ground tool is used.

Before proceeding with the detailed relation of the objects of the invention and with the specification of the illustrated embodiment thereof, certain terms therein used should be defined. The grinding of the teeth of the tools for which the present invention is intended involves the grinding of the portions of the teeth immediately in rear of the cutting edge having regard for the direction of the tool relative to the work on which it is being used. With regard for the teeth which are at least substantially parallel to the axis of rotation of the tool the angles of the ground surfaces are determined with reference to a line tangent to the radius of the cutter at the edge of the tooth and as before stated, there is generally a narrow first clearance extending rearwardly from the tooth edge hereinafter called the "primary clearance" and a usually somewhat wider clearance extending rearwardly from the rear edge of the primary clearance and hereinafter called the "secondary clearance," said terms being those most generally used in machine shops. The primary clearance is formed at the smallest possible angle to give relief to the cutting edge and afford maximum strength thereto without the rear edge thereof engaging and dragging on the machined surface of the work and the secondary clearance is likewise formed at the least angle possible having regard for the feed of the tool or work and the width of the surface thus ground that will not drag on the machined surface and which, of course, is at a greater angle to the said tangent line than is the primary clearance. Primary and secondary clearances also vary for the type of material to be cut by the tools and, in general, the softer the material, the greater the clearance angles.

Another term in general use in machine shops is "grinding geometry" which refers to all of the angular and dimensional interrelations of the cutter teeth to each other and the axial line of the tool and including cutter size, grinding wheel size, helix angles, axis rake, radial rake, clearances, taper, etc., and this term will also be employed at times in the relation of the objects of the invention and in the specification of the illustrated embodiment.

Having the foregoing considerations and definitions in mind, the principal object of the invention is to provide a machine for grinding the teeth of milling cutters, end mills, reamers and the like which is so constructed and arranged that the machine can be adjusted quickly and usually without the necessity for any calculations to correctly grind either or both primary and secondary clearances on cutter teeth at a desired angle or angles, wherefore, the high degree of skill required to properly make the required calculations is dispensed with and the time required to set up the machine for a given cutter is reduced with resultant economies both in time and in the rate of pay for the operator and consequent decreased cost and increased production of increasingly accurately ground and sharpened tools.

Another object of the invention is to provide a machine for grinding the teeth of milling cutters, and mills, reamers and the like which is so constructed and arranged as to be quickly set to accommodate any desired portion of the grinding geometry of any one of a wide range of such tools, which requires little, if any, mathematical calculation as an incident to being set or adjusted and does not require a high degree of skill to operate.

Still another object of the invention is to provide means in a machine for grinding the teeth of milling cutters, end mills, reamers, and the like for angularly positioning the grinding wheel in any one of a plurality of predetermined angular positions preparatory to the tooth grinding operation.

A further object of the invention is to provide in a machine for grinding the teeth of milling cutters, end mills, reamers, and the like, a grinding wheel mounting means tiltably movable to one or the other of a predetermined pair of angular positions whereby in one of said positions it is positioned to grind the primary clearance on the teeth of a cutter and in another of said pair of positions it is positioned to grind the secondary clearance on the cutter teeth.

A still further object of the invention is to provide a machine for grinding the teeth of milling cutters, end mills, reamers, and the like in which the spindle which carries the grinding wheel is tiltable to selected ones of a plurality of angular positions and is self-securing in any one of the angular positions to which it may be moved.

Still another object of the invention is to provide a grinding wheel mounting means for a tool grinding machine in which the grinding wheel may be adjusted about a horizontal axis to any one of a plurality of predetermined angular positions within a wide range and with a minimum of change in the vertical position of the grinding wheel.

A still further object of the invention is to provide a machine for grinding the teeth of milling cutters, end mills, reamers and the like employing a cup type grinding wheel mounted for movement to selected predetermined angular positions about a horizontal axis and in which the peripheral portion of the wheel may be employed for grinding operations without the necessity for computations for adjustment to accommodate the variations in wheel diameter deriving from wear of the grinding wheel.

A still further object of the invention is to provide a work supporting table for a machine for grinding milling cutters, end mills, reamers, and the like in which the said table is mounted on and is secured to roller means on which it is freely reciprocable and to combine maximum rigidity, minimum weight and highly sensitive response to efforts causing traverse of the table.

Still another object of the invention is to provide a machine for grinding milling cutters, end mills, reamers, and the like having a tool supporting table mounted for reciprocation on a support with optional means for effecting reciprocation of the table comprising either manually pushing and pulling the table directly, or a manually operable rack and gear means or a screw threaded means, and in which said support includes releasable means for clamping the screw threaded means to the support to lock the table against reciprocation.

A still further object of the invention is to provide a machine for grinding milling cutters, end mills, reamers, and the like in which a horizontally reciprocable table carries a tool supporting means thereon and in which the tool supporting means is susceptible of adjustment thereon about a vertical axis to any desired angle relative to the line of reciprocation of the table.

Still another object of the invention is to provide a machine for grinding milling cutters, end mills, reamers, and the like including a tool holding means having a direct reading indexing ring and releasable stop means engageable therewith for fast, accurate indexing to accommodate cutters having different numbers of teeth.

Still another object of the invention is the provision in a tool grinding machine having a rotatable grinding wheel of a table adapted to support the tool holding means and which is reciprocable in a line extending at right angles to a vertical plane containing the axis of the grinding wheel together with mounting means for the table which allows a rocking movement of the table about an axis extending parallel to the line of reciprocation of the table.

A still further object of the invention is to provide a machine for grinding milling cutters, end mills, reamers, and the like which includes a tool supporting and engaging means which is mounted on means reciprocable in a horizontal line and which is adjustable about a vertical axis with resultant capacity of the machine to grind tapered cutters.

Still another object of the invention is to provide a machine for grinding milling cutters, end mills, reamers, and the like including a work head means for holding the tools to be ground and which includes interchangeable collet means for various sizes of tool shanks and arbors and which further includes as a replacement for a collet therein a lightweight spindle having free running bearing means effective to hold small size tools and present them to be ground with maximum sensitivity.

A still further object of the invention is the provision in a machine for grinding toothed cutters of a tool tooth guide or rest means comprising a support and a plurality of interchangeable heads mountable on the said support and each of said heads having a tool tooth engaging blade of a configuration conforming to a helix angle near or equivalent thereof of a particular tool.

Still another object of the invention is to provide a tool grinding machine having a grinding wheel, a guard covering the grinding wheel, a tool holding and guiding means and a tool tooth rest carried by said guard and positioned for engagement by a tool on said holding means.

A still further object of the invention is the provision for a machine for grinding milling cutters, end mills, reamers, and the like of means for supporting a grinding wheel for quick tilting of the axis of the grinding wheel about a horizontal axis to a desired one of a plurality of predetermined positions with reference to the horizontal.

Still another object of the invention is the provision for use in a tool grinding machine of a reciprocable work supporting table and a support therefor and in which the tool rest and table are rockable as a unit about the line of table reciprocation.

A still further object of the invention is to provide a machine for grinding milling cutters, end mills, reamers, and the like comprising a grinding wheel supporting spindle bearing mounted for tilting movements to predetermined extents about a horizontal axis, a reciprocable work holding means and supporting means for said work holding means adjustable vertically and horizontally at right angles to the direction of reciprocation of said work holding means, said machine further carrying indicia by which the proper adjustment of each tool to be ground can be ascertained with little, if any, resort to calculations.

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

Fig. 1 is a front elevational view of a tool grinder embodying the invention,

Fig. 2 is an enlarged scale fragmentary elevational view of the machine as viewed from the left hand side of Fig 1, Fig. 3 is a slightly enlarged right hand side elevational view of the machine shown in Fig. 1, Fig. 4 is a side elevational view of the wheel angle determining cams placed on their storage rack means, Fig. 5 is a view of the indicia plate to which reference is had to determine the cam to be used for a specific tool to be ground, Fig. 6 is a top plan view of the machine on the same scale as shown in Fig. 3, Fig. 7 is a medial sectional view taken on the line 7—7 of Fig. 1, the driving motor being shown in full lines, Fig. 7a is a reduced scale, fragmentary, right hand end elevation of the spindle driving means, Fig. 8 is a left hand elevational view of the tool supporting table and its mounting, the view being taken on the line 8—8 of Fig. 1, Fig. 9 is a partially sectional front elevation taken on the staggered line 9—9 of Fig. 3, Fig. 10 is a transverse sectional view of the tool holding chuck means or work head taken on the staggered line 10—10 of Fig. 6, Fig. 11 is an enlarged scale, partially sectional top plan view of details of the indexing means for the work head, Fig. 12 is a fragmentary sectional view of the indexing means taken on the line 12—12 of Fig. 6, Fig. 13 is a respective view of an alternate indexing collar or sleeve employed for cutters having a greater number of blades or teeth than is accommodated by the corresponding element illustrated on the machine, Fig. 14 is a top plan view of the supporting means for the reciprocating table, portions being broken away for clearness of illustration, Fig. 15 is a bottom plan view of the reciprocating table, Fig. 16 is a top plan view of the micrometer means for causing traverse of the reciprocating table, Fig. 17 is a top plan view of the base plate for the reciprocating table support, Figs. 18 and 19 are respectively, transverse sectional views taken on the lines 18—18 and 19—19 of Fig. 14 showing further details of the table and its supporting means, Fig. 20 is a top plan view of the wheel supporting end of the grinding wheel spindle and its bearing means showing the pivotal mounting thereof and the means for varying the pivotal position thereof, Fig. 21 is a sectional view taken on the line 21—21 of Fig. 20 showing details of the cam operating means for varying the angular position of the spindle and grinding wheel, Fig. 22 is a view taken on the line 21—21 of Fig. 20 showing details of the means for moving the cam operating means to inactivate position with resultant provision of clearance for moving the spindle means to a position below horizontal, Fig. 23 is a side elevational view taken on the line 23—23 of Fig. 21 showing the manner in which the positioning cam supports the spindle, Fig. 24 is a view similar to Fig. 23 but showing the cam in a second position increasing the angle of the wheel face relative to a vertical plane, Fig. 25 is a side elevational view taken from the right hand side of Fig. 20 showing the spindle raised and locked in tilted position for the replacement of the tilt determining cam with another cam, Fig. 26 is a fragmentary sectional view taken on the line 26—26 of Fig. 25 showing the means for locking the spindle in the position shown in Fig. 25, Fig. 27 is an enlarged scale side elevation of the tool rest head and supporting means as viewed from the right hand side of Fig. 9, Fig. 28 is a front elevation of the tool rest head element of the guide shown in Fig. 27, Fig. 29 is a top plan view of Fig. 28, Fig. 29a is a fragmentary, greatly enlarged front elevation showing the configuration of the tool rest shown in Fig. 28 in greater detail, Figs. 30 and 31 are, respectively, right hand side elevational and top plan views of an alternate form of tool rest head employed for certain operations on the machine, Fig. 32 is a plan sectional view taken on the line 32—32 of Fig. 1 showing details of the mounting and angular adjustment of the work head in the position thereof of most frequent use, Fig. 33 is an end elevational view of the portion of the machine shown in Fig. 32, Fig. 34 is an enlarged scale sectional view taken on the line 34—34 of Fig. 1 showing details of the rack and gear means of traversing the table, Fig. 35 is a perspective view of a gauge employed in adjusting the machine and a tool to be ground for proper relative positions, Fig. 36 shows the gauge as employed in rotatively positioning a cutter preparatory to grinding the teeth thereof which extend at right angles to the axis of the cutter, Fig. 37 shows the operation of grinding the end teeth, Fig. 38 shows the gauge employed to set a tool rest of the type shown in Fig. 30 preparatory to grinding the teeth on the side of an end mill, Fig. 39 is a top plan view showing the grinding of the side teeth or outside diameter of an end mill, Fig. 40 is an enlarged end elevational view of the operation shown in Fig. 39, the view being substantially that as viewed from the left hand side of Fig. 39 and rotated 90° to bring the elements into their normal relationship, Fig. 41 is a greatly enlarged end elevation of a ground cutter tooth showing the primary and secondary clearances formed by the grinding, Fig. 42 is a view similar to Fig. 39 but showing the use of the alternate tool rest illustrated in Figs. 30 and 31, Fig. 43 is a plan view showing the set-up employed for grinding the taper ends of the teeth of a reamer or like tool, Fig. 44 is a side elevation of the set-up shown in Fig. 43 as viewed along a line at right angles to the axial line of the tool holding means, Fig. 45 is a perspective view of an auxiliary supporting plate for the work head employed for set-ups such as shown in Figs. 43 and 44, Fig. 46 is a front elevational view of an alternative tool rest which is mounted on the grinding wheel guard, Fig. 46a is an enlarged fragmentary view similar to Fig. 46 showing the configuration of the tool rest in more detail, Fig. 47 is a left hand side elevational view of the tool rest and guard shown in Fig. 46, and Fig. 48 is a medial longitudinal view of the work head and showing the mounting therein of a means for supporting very small tools characterized by greater ease of rotating the tool from tooth to tooth and more sensitive feel while grinding the tool.

Main frame

The main frame of the machine comprises a base casting 1 having a pad portion 2 adapted to be supported on a sub base, bench or the like adapted to position the point of operation of the machine at a convenient height for an operator. The base includes a column 3 on which a yoke 4 is secured by bolts 5 with capacity for limited adjustment about the axis of a vertical dowel pin 5' disposed in the vertical centerline of the yoke, said yoke carrying the spindle and driving means generally indicated at 6. The front face of the column 3 is provided with a vertical dovetail slot 7 including a gib 8 in which the complementary dovetail portion 8' of a knee 9 is mounted for vertical movement. The front face of the pad 2 is provided with a bearing in which a horizontal shaft 10 is mounted, said shaft exteriorly of the pad carrying a handle 11 and interiorly of the column carries a bevel gear 12 which meshes with a bevel gear 13 carried by a vertical shaft 14 having the lower end thereof journalled in a bearing 15 carried by a laterally extending lug 16 on the inner face of the pad portion 2. The upper end of the shaft 14 is provided with threads 17 which engage a nut 18 secured to the inner face of the knee 9 by a stud 19 and nut 20. Thus, by revolving the shaft 10 the knee 9 can be adjusted vertically on the face of the column 3.

The upper horizontal face of the knee 9 is formed with an external dovetail way 21 extending toward the upper part of the column 3. Slidably mounted on this way is a table supporting saddle 22 carrying a gib 23. The front face of the saddle 22 carries a depending bearing 23' in which the front end of a shaft 24 is journalled. Exteriorly of the bearing 23' the shaft 24 carries a hand wheel 25. The opposite end of the shaft 24 is provided with threads 26 which engage a nut 27 secured to the knee 9 by a stud 28 and nut 29. Thus, by rotating the shaft 24 in one direction or the other the saddle base 22 can be moved toward and from the plane of the grinding wheel as will be presently described in more detail.

Table and table support

Fixed to the upper face of the saddle 22 by bolts 30 is a table supporting member 31 which is a flat plate generally rectangular as viewed in plan and having adjacent each end thereof one each of a pair of upstanding lugs 32, 32, said lugs extending transversely of the member 31 and adjacent one end thereof carrying cone point bearing screws 33, 33, secured in place by set screws 34, 34. Adjacent their other ends the lugs 32, 32 are provided with axially aligned bores 35, 35 affording clearance for the traverse of a table adjusting rod 36, the use of which will be explained in detail in connection with the traverse of the table.

Mounted for a limited oscillatory movement on the opposed points of the screws 33, 33 is a table guiding member 37. The table guiding member 37 is a casting of generally flat, rectangular configuration having a central depression 38 and having clearance notches 39, 39 at each end thereof in which the lugs 32, 32 are received, said clearance notches being extended upwardly above the top surface of the table guiding member by walls 40, 40 to at least partially seal off the opening between the table 41 and the guiding member 37.

Adjacent the edge thereof nearest the column 3 the guiding member 37 and the table supporting member 31 carry opposed bosses 42 and 43, respectively. (See Fig. 8.) Adjacent their opposite or forward edges the members 31 and 37 are provided with shallow axially aligned sockets 44, 44 and 45, 45, respectively, in which are mounted compression springs 46, 46 tending constantly to urge the table guiding member 37 in a clockwise direction as viewed in Figs. 3, 7 and 19 about the axis defined by screws 33, 33 to the extent permitted by engagement of the bosses 42 and 43. The guiding member 37 at its front edge is provided with a forwardly projecting handle 47 by which it can be rocked on its pivotal mounting against the bias of the springs 46 to the extent permitted by an adjusting or stop screw 48 threadedly mounted in the front edge of the member 31 (see Fig. 18).

The guiding member 37 inwardly of the rear edge thereof and adjacent each end thereof is provided with one each of a pair of substantially vertical studs 49, 49 secured by set screws 50, 50. The studs are each provided with a shoulder portion 51 engaging the upper face of the member 37 and above the shoulder carry a reduced diameter axially aligned portion 52 carrying one each of a pair of rollers 53, 53, respectively. Inwardly of the front edge thereof and opposite the studs 49, 49 the member 37 carries a pair of substantially vertical studs 54, 54 secured therein by set screws 55, 55. The studs 54 each have a shoulder portion 56 engaging the upper face of the member 37 and extending upwardly from the shoulder 56 is a reduced diameter stud portion 57 which is eccentrically disposed with respect to the axis of the stud 54, said reduced diameter studs carrying one each of a pair of rollers 58, 58. The rollers 53, 53 and 58, 58 are formed with rounded edges and engage complementarily shaped grooves 59, 59 formed on the inner faces of depending ledges 60, 60 on the table 41. The studs 54 extend below the lower surface of the member 37 and are provided with transverse holes 61 for engagement by a capstan bar whereby they may be rotated with resultant adjustment of the rollers 58, 58 through the eccentric position of the stud portion 57 to take up all slack between the grooves 59, 59. Preferably the rollers are ball bearing mounted to further increase the ease of movement of the table thereon.

The studs 49, 49 and 54, 54 have been referred to above as being "substantially vertical." Actually (see Fig. 19) they are upwardly divergent from the vertical on the order of about 5°, the studs 49, 49 extending upwardly and rearwardly and the studs 54, 54 extending upwardly and forwardly. By thus inclining the studs, the tightening of the rollers to engage the raceway formed by the grooves 59, 59 produces both thrust and radial loads on the rollers eliminating any side play therein and consequently eliminating play vetrically in the table without significantly increasing the frictional resistance of the rollers. Thus, any play between the table and the support for the rollers is reduced to a minimum.

On its under face the front ledge 60 of the table carries a longitudinally extending rack 62 engageable (see Fig. 34) with a pinion 63 carried by a shaft 64 journalled in a bracket 65 secured by screws 66 to the under face of the member 37 and projecting forwardly from the right hand end thereof, said shaft exteriorly of said bearing bracket carrying a crank 67 secured thereon by a set-screw 68. In addition to being rotatable in the bearing bracket 65 the shaft is axially shiftable between a point at which the pinion 63 is in engagement with the rack 62, and another point at which the pinion is shifted outwardly out of the path of the rack, the bracket 65 being provided with a recess 69 into which the pinion is moved when out of engagement with the rack 62. The two positions of the shaft 64 are maintained by a spring biased ball 70 engaging one or the other of grooves 71 or 72 under the influence of a compression spring 73 disposed in a hole 74 and held therein by a cover plate 75, secured by a screw 76. Thus, the table 41 may be traversed along the supporting rollers either manually with or without the pinion 63 engaged or, with the pinion engaged, by operation of the crank 67.

As will be later explained in more detail, it is necessary at certain times to lock the table against traverse and to provide micrometer means for moving the table endwise to a desired adjusted position. To this end, the left hand end of the table carries a depending bracket 77 in which a hollow stud element 78 is secured, the element being disposed on the outer face of the bracket 77 and having a reduced diameter portion extending through the bracket and spun or riveted over the inner face of the bracket 77 (see Fig. 9). Mounted on the exterior of the stud element 78 is the inner race of a ball bearing 79 and the outer race of said ball bearing is carried by a nut element 80 threadedly engaging the threaded end of the rod 36. The outer face of the nut element 80 is provided with a knurled hand engaging face 81 and with a peripheral surface 82 carrying graduations indicating the amount of relative axial movement between the rod 36 and nut 80. The rod 36 between the holes 35, 35 in the lugs 32, 32 passes through a close fitting hole 36' in the member 37 and extending transversely through the member 37 to the hole 36' through which the rod 36 passes and extending transversely to this hole is a bore 83 in which a clamp screw 84 is threadedly mounted, said clamp screw having an unthreaded end 85 adapted to clampingly engage the side of the rod 36. Thus, when it is desired to lock the table against free traverse on the rollers 53 and 58, the clamp screw 84 is tightened against the rod 36. Thereafter, rotation of the nut 80 will move the table in either direction in desired small increments and hold the table against movement until either the nut 80 is turned or the rod 36 released from the clamping engagement with the screw 84. It is to be noted that the table can be thus locked at any point in its traverse. It is also to be noted that the holes 35, 35 are sufficiently large to permit the tilting action of the member 37 and the table carried thereby without interference.

*Work head or cutter support and indexing means*

The work head or cutter support comprises a base 86 having a bottom pad 87 from which rise ribs 88 and 89 supporting an integrally formed sleeve portion 90 having counterbores 91 and 92 at its forward and rear ends, respectively, in which ball bearings 93 and 94 support a collet retaining sleeve 85 for free rotation. The collet retaining sleeve is provided with a shoulder 96 at its forward end engaging the face of the bearing 93 and adjacent the outer face of the bearing 94 is threaded for engagement by a lock-nut 97 which engages the outer face of the bearing 94. Beyond this threaded portion the collet retaining sleeve 95 projects in a cylindrical outer surface 98 on which an indexing ring 99 is secured by a set screw 100 engaging a peripheral groove 101 in the surface 98. The collet retaining sleeve is hollow and at its forward end is provided with an outwardly flaring surface 102 engageable with the complementary tapering head portion 103 of a spring collet 104 extending therethrough and terminating in a threaded end 105 engaged by a hand nut 106 having a sleeve portion 107 extending into a counterbore 108 in the sleeve member 93 (see Fig. 9). Surrounding the collet retaining sleeve 95 midway between the bearings 93 and 94 is a ring 109 which is held against rotation by a clamp screw 110 extending through the sidewall of the sleeve portion 90 and engaging a socket 111 formed in the outer surface of the ring 109. (see Fig. 10). Tightening the clamp screw 110 causes the ring 109 to securely clamp the collet retaining sleeve 95 against rotation.

The table 41 adjacent the right hand end, is provided with a vertical bore 112 terminating at its lower side in a counterbore 113 in which a stud member 114 is located with the head thereof engaging the counterbore 113. The stud element 114 extends above the top surface of the table 41 and the pad 87 of the work head base is provided with a vertical bore 115 closely fitting the body of the stud 114. The stud 114 is interiorly threaded for engagement by a screw 116 having a large head 117 disposed in the space between the sleeve portion 99, the ribs 88 and 89 and the top surface of the pad 87, said screw being provided with capstan holes 118 whereby it may be rotated to clamp the base tightly upon the table in any desired rotative position about the stud 114.

The rear face of the pad 87 is rounded about the axis of the stud 114 and is provided with a quadrant scale 119 reading in degrees from both sides of the center thereof with reference to a reference line 120 on the end of the table 41. At the side surface of the pad portion 87 adjacent the front edge of the table 41 and the rear end of the pad 87 is a spring pressed plunger 121 engageable with a stop 122 carried by a bolt 123 having a head 124 slidably engaging a T-slot 125 extending longitudinally of the front face of the table 41. A thumb screw 126 engaging the bolt 123 serves to clamp the stop 122 in adjusted position along the slot 125. At its opposite side the pad 87 carries a plate member 127 secured thereto by screws 128 and the table 41 carries a plate 129 secured thereto and extending above the plane of the top surface of the pad 87. The plate 129 directly opposite the pad 87 carried a stop screw 130 engaging the outer surface of the plate 127 and secured in adjusted positions by a locking screw 131. The plate 129 also carries an adjusting screw 132 also engaging the plate 127 and operable to swing the pad 87 about the axis of the stud 114, the threads of the screw being such that each turn of the screw shifts the work head approximately 1°. The outer surface of the portion 133 of the plate 129 which extends above the top surface of the pad 87 serves as one side of a sine bar, the other portion of which is a pin 134 extending upwardly from the pad 87 directly in the longitudinal center line of the pad, whereby certain angular relationships of the tool support may be determined in a manner later to be described.

At the side of the sleeve portion 90 of the work head base above the rear face of the table 41 is a laterally extending lug 135 having a rectangular hole 136 extending therethrough parallel to the axis of the bore in the sleeve 90. Slidably mounted in the hole 136 is the shank 137 of the indexing stop means, said shank having a head portion 138 carrying a spring pressed plunger 139 disposed in a line extending radially of the axis of the collet supporting sleeve 95 and engageable with holes 140 formed in the outer surface of the indexing sleeve 99. The indexing sleeve on its outer surface carries peripheral rows of holes equivalent to the usual numbers of flutes or teeth on the cutters to be ground, and the shank 137 carries indicia representing the number of holes in a peripheral row around the sleeve in the position along the hole 136 to which the shank may be moved and secured by a thumbscrew 141 carried by the lug 135 and engaging conical depressions 142 formed in the surface of the shank 137. In the form illustrated in Figs. 1, 6 and 11, the sleeve 99 and the shank 137 are arranged for cutters having from four to twelve teeth or flutes. For cutters having a greater number of teeth or flutes other indexing rings may be substituted for the ring 99 by loosening the setscrew 100, removing the handnut 106 and exchanging the indexing rings. In such case another face of the shank 137 may be provided with suitable indicia, as indicated in Fig. 12 at 143 to correspond with the holes 144 in the alternate ring 145 illustrated in Fig. 13. The manner of locating a tool in the tool supporting means with reference to the indexing means will be described in detail in connection with the description of the operation of the machine.

*Spindle and drive*

The grinding wheel 146 is a cup wheel and is mounted on a collet 147 and is secured thereon by a nut 148. The collet, in turn, is secured to the tapered front end of the spindle 149 by a socket type cap screw 149a having a head disposed in a counterbore 149b in the collet 147 and having a threaded shank 149c extending into and engaging the spindle 149 (see Fig. 7). The spindle at its forward end is supported by duplex ball bearings 150 and 151 secured in a counterbore 152 in the spindle supporting member 153 by a nut 154. At the rear end the spindle is supported by a ball bearing 155 and beyond the ball bearing 155 the spindle carries a belt pulley 156 connected by a belt 157 to the driving pulley 158 of a reversible electric motor 159 having its driving pulley end mounted on the face of a ring 160 and secured by bolts 161 and 161', said ring at its lower end terminating in a sleeve portion 162 surrounding the rear end of the spindle supporting member 153. The sides of the ring member form a guard for the belt 157. The bolt 161, when loosened, serves as a pivot and the bolt 161' extends through an arcuate slot 160' whereby the motor may be swung to tighten the belt 157. The rear end of the motor is supported by a jack screw 163 threaded into the member 153 above and adjacent to the ball bearings 150 and 151. The member 153 (see Fig. 20) adjacent its forward end is provided with oppositely disposed conical bearing surfaces 164, 164 which are engaged by cone point setscrews 165, 165 extending through the arms 166, 166 of the yoke member 4 and secured by locknuts 167, 167 whereby the spindle supporting member 153 is thus pivotally mounted on the yoke member at a point closely adjacent the grinding wheel 146 (see Fig. 20).

Mounted for oscillation in a bearing 168 in the right hand arm 166 of the yoke member 4 (see Figs. 20, 21 and 22) is a shaft 169 extending at right angles to the spindle, said shaft carrying a collar 170 secured thereto by a pin 171 and forming a portion of the bearing for the shaft 169. The end of the shaft 169 adjacent the spindle supporting member 153 is formed as a square shank 172 on which a selected and appropriate one of the positioning or angle determining cams 173, 174, 175 and 176 may be interchangeably mounted, said cams being preferably stored on studs 176' at the rear face of the machine (see Figs. 3 and 4). Mounted on the side face of the member 153 is a roller 177 adapted to engage the notches in the peripheries of the cams above referred to and to be held therein by the weight of the spindle and motor and thus determine the angular position of the spindle and motor unit about the axis defined by the setscrews 165, 165 and the position of the face of the grinding wheel 146 at a desired angle with respect to a vertical plane. The selection of cams and their purpose will be later explained in detail.

Exteriorly of the boss 178 carrying the bearing for the shaft 169 the shaft carries a clutch collar 179 secured thereto by a pin 180, said collar on the outer face thereof having a clutch face 181 comprising shallow grooves extending diametrically across said outer face at right angles to each other and adapted to be optionally engaged with and disengaged from a mating clutch face 182 on a hub 183 freely rotatably mounted on the shaft 169 and having an operating handle 183' extending radially therefrom. The outer face of the hub 183 is provided with a counterbore 184 housing a compression spring 185 surrounding the shaft 169 and reacting between the head 186 on the shaft 169 and the bottom of the counterbore to yieldingly hold the clutch faces in engagement with the handle extending optionally in any of four positions as may best suit the convenience of the operator. The boss 178 at the upper surface thereof carries a plunger 187 carried by a shank 188 having a head 189, said shank and plunger being carried by a socket member 190 threaded into the boss 178. When plunger 187 is retracted the shaft 169 can be moved completely to the right as shown in Fig. 22, withdrawing the square shank portion 172 entirely within the boss 178 for purposes to be later explained. Also, the right hand arm 166 of the yoke member 4 carries a locking pin 191 movable into and out of a hole 192 in the side face of the spindle supporting member 153 at a position in which the spindle supporting member is tilted up to a nearly vertical position to permit the interchange of cams as indicated at Fig. 25, said locking pin 191 (see Fig. 26) having a peripheral groove 193 releasably engaged by a retaining pin 194 slidably mounted in a hole 195 in the top of the member 166 and having its outer end secured to the free end of a leaf spring 196 having its other end secured to the top surface of the member 166 by a screw 197. The spindle supporting member 153 includes a laterally extending ledge 198 disposed below the hole 192 effective to engage the end of the locking pin as the spindle unit is thus tilted to position the unit for engagement by the locking pin.

Tool rest

When the machine is employed for grinding the side teeth of cutters and like tools, a tool rest is employed for properly positioning and supporting the tooth being ground closely adjacent to the point of grinding, a type of tool rest employed with the present invention being shown in Figs. 1, 9, 27, 28, 29 and 39. The tool rest element comprises a tooth engaging blade 200 formed of carbide or other suitably hard material brazed to a head 201 having a vertical hole 202 therein fitting over the end of a stud 203 and clamped in position thereon by a setscrew 204. The stud 203 at its lower end is threaded and extends downwardly through a bore 205 in the end 206 of a bracket arm 206'. The threads of the stud 203 are engaged below the bracket arm by a thumbnut 207 and above the bracket arm by a second thumbnut 208 having a micrometer scale portion 209 thereon registerable with a line 210 on the bracket arm as best shown in Fig. 9. By appropriate adjustment of the thumbnuts 207 and 208 the tool rest 200 can be raised or lowered to an exactly determined extent, the nut 207 serving as a locknut and being provided with a series of capstan holes 211 to permit its being tightened.

The bracket arm 206' is of cylindrical cross section and carries a groove 212 extending longitudinally along one side thereof. The bracket arm extends through a bore 213 in the head 214 of a supporting post 215 and the head 214 carries a clampscrew 216 engageable with the groove 212 whereby the position of the bracket arm may be adjusted relative to the supporting post 215. The supporting post 215 at its lower end carries a head 217 having a horizontal slot 218 on one face thereof engageable with a boss 219 on the rear edge of the table guiding member 37 at about the mid-length thereof (see Figs. 14 and 27). A manually operable clampscrew 220 having a shank 221 threaded into the boss 219 and extending through a hole 222 in the head 217 serves to clamp the post 215 in a vertical position.

As best shown in Figs. 27 and 28, the tool rest 200 is in the form of a narrow blade having a sloping tool edge engaging face 223 and this face is positioned closely adjacent to the face of the grinding wheel 146 (see Figs. 9 and 39). The sloping face 223 is at an angle to the horizontal which is not less than the greatest helix angle of the tools to be ground on the machine. Most spiral tooth milling cutters have the teeth thereof disposed at a helix angle of 15° and spiral tooth end mills have the teeth disposed at helix angles of either 30° or 45°. Preferably the top edge of the blade extending rearwardly from the uppermost portion of the sloping face 223 is slightly inclined downwardly on the order of about 3° as indicated at 223a in Fig. 29a. The relation of the tool rest 200 to a cutter tooth being ground is best shown in Fig. 39 wherein it will be noted that this tool rest is usable on cutters in which the tooth extends radially beyond the shank of the cutter. It is equally useful for cutters mounted on an arbor held in the work head. In some cases, especially with smaller diameter cutters the edge of the tooth is of the same diameter or even of lesser diameter than the cutter shank. In such cases (see Figs. 30, 31 and 42) a tool rest such as 224 is employed, said tool rest comprising a head having a flat, thin tooth engaging blade 225 which is disposed closely adjacent to the side face of the grinding wheel. The mode of adjustment of the tool rest will be described in connection with the description of the operation of the machine.

Operation of the machine

The operation of the machine will be described in connection with grinding an end mill. This involves separate set-up arrangements for grinding the end teeth and the side teeth. The end teeth may not be ground as frequently as the side teeth. For either operation the first step is the mounting of the proper size collet for the tool shank in the work head. Then assuming that the grinding is to involve grinding both the end teeth and the side teeth and that the end teeth are to be ground first, the end mill shank is secured in the work head collet.

The next step is to bring the teeth of the end mill into registry with the holes in the indexing ring 99. The shank 137 which carries the indexing plunger 139 is moved longitudinally until the plunger is aligned with the row of holes corresponding to the number of teeth on the end mill and the sleeve is rotated until the plunger drops into one of the holes in the selected row. The setscrew 100 is loosened and a setting gauge 226 (see Fig. 36) having a base 227 is placed on the surface of the table 41. The upper end of the gauge includes a laterally extending arm 228 having an upper surface 229 disposed in the horizontal plane containing the axis of rotation of the sleeve 95 and therefore of the collet and end mill mounted therein. The sleeve 95 is rotated with the ring 99 being held by the plunger 139 until the edge of one of the end teeth is aligned with the surface 229 of the gauge and the setscrew 100 is then tightened thus locking the indexing ring to the sleeve with the appropriate row of holes in proper registry with the teeth of the end mill.

The end teeth of the end mill are grounded at a slight concave angle so the next step is to angularly position the work head about the stud member 115. The screw 116 is loosened slightly and the adjusting screw 132 is rotated to swing the work head a slight amount in a clockwise direction as viewed in Fig. 6, to give the desired concavity to the end of the cutter. This is usually a half of one degree. Since the tool is held and located by the indexing means, the tool rest is not required and is removed from the machine until the teeth forming the outside diameter of a cutter are to be ground. The next step is to position the table in the correct position to grind the proper clearance angle on the end teeth. To this end, the angle producing cams are removed from the shaft 169 and the shaft is pulled to the inactive position shown in Fig. 22. The spindle and motor unit is swung about the pivot to the substantially horizontal position shown in Fig. 2 in which the spindle is indicated by the quadrant 230 to be tilted downwardly at the wheel end 2° in which position it is located by a stop 231 which engages the end of the plunger 192. A clamp screw 232 is provided at the opposite side of the yoke arm 166 for use, when desired, to clamp the spindle 6 in any angular position.

The vertical position of the table is then determined by reference to an indicia plate 233 on the left hand side of the yoke member 4 (see Fig. 2). The upper portion of this indicia plate shows that for end mills of four or more flutes a 5° clearance angle is required and that for two flutes a 7° clearance is required. Also, reference is had to the lower end of a scale 234 mounted on the column 3 adjacent the face of the knee 9. The knee 9 carries a reference mark 235 and the lower end of the scale 234 carries reference marks indicated as 5° and 7°. Since the cutter being considered is a four-tooth cutter, the knee is adjusted vertically until the reference line 235 is opposite the 5° mark. This brings the center line of the cutter sufficiently below the horizontal plane containing the axial line of the spindle and grinding wheel so that the tangent of the angle at the point of contact of the edge of the tooth with the periphery of the grinding wheel will be 5°.

The next step is to position the end of the end mill in proper proximity to the grinding wheel. To this end the table is moved endwise along the rollers and the table supporting means is moved inwardly toward the grinding wheel until the outer edge of the tooth to be ground is spaced slightly from the peripheral edge of the grinding wheel adjacent to the face thereof. The clamp screw 84 is then tightened against the rod 36 and the hand nut 80 is rotated until the end of the tool touches the grinding wheel. The table supporting means is then moved inwardly and outwardly by the hand wheel 25 to an extent necessary to cause the tooth being ground to be traversed back and forth across the said peripheral edge of the grinding wheel. The tool support is then indexed to position the next tooth, and it is likewise ground, and this procedure is followed until all of the teeth have been ground.

The grinding of the teeth on the side of the end mill may precede or follow the grinding of the end teeth or it may be done without grinding the end teeth. In this operation, the end mill is secured in the proper collet in the work head and the indexing pin 139 is moved to inoperative position, if engaged, leaving the sleeve 95 freely rotatable. If the table 41 has been secured against rocking by the screw 48, that screw is rotated to permit the said lateral rocking movement. The screw 84 is also released (if engaged with the rod 36) so that the table is free to be moved endwise on its supporting rollers. If the cutter to be ground is a straight cutter, the work head is returned to appropriate position on the table, or if the cutter is tapered, it is swung to the appropriate angular position.

The next factor to be considered is the diameter of the tool to be ground, and assuming, for example, that it is an end mill of ¾" diameter, reference is had to the indicia plate 236 on the right hand side of the yoke member 4 on which the settings produced by the four cams shown in Fig. 4 are shown. Assuming that a primary clearance angle of 5° is desired, the column headed 5° is followed down until the line containing a cutter diameter range including the diameter of the cutter to be ground. In the present instance, this is the line indicated by the range 11/16–7/8. The indicated cam for a 5° primary clearance is cam number 5 of which the notch 237 will position the grinding wheel in a plane which is disposed at 9° to the vertical and in which the notch 238 will position the grinding wheel face at 17° to the vertical and these angles will produce the required 5° and 10° primary and secondary clearances on the tool being ground. If a 6° primary clearance should have been required, the notches 237a and 238a would be employed on the same cam element, said two notches being indicated by the number "6" on the indicia plate and on the end of the cam. These notches would also properly position the wheel to grind 5° and 10° clearance angles on cutters ranging between ½" and 5/8" diameter. It will be understood that the sizes shown on the illustrated plate are those within the range of the specific model of the machine which constitutes the illustrated embodiment of the invention and that for sizes of cutters larger than about 4" diameter, the notches on cam 176 designated by the numeral "1" would be employed.

Having thus positioned the wheel at the desired angle to grind the primary clearance, the tool rest is next brought under the tooth of the cutter. Next, the table and work head are adjusted vertically to bring the tool to the correct elevation and for this purpose reference is had to the scale 234 on the left hand side of the frame adjacent to the knee and to the quadrant 230 on the bearing member 6. The cam will have moved the member 6 to a position 9° from the horizontal and the knee is adjusted vertically until the reference line 239 thereon is positioned just above the 10 mark on the scale 234 which positions the axial line of the work head in a horizontal plane containing the axial line of the end face of the grinding wheel. In other words, this vertical adjustment compensates for the vertical movement of the grinding wheel incident to the angular positioning thereof. The tool rest is then adjusted so that the blade thereof is as close as possible to the face of the grinding wheel and so that the point at the juncture of the faces 223 and 223a thereof is in the said horizontal plane of the axis of the work head and wheel face and is at the outside diameter of the wheel. One tooth of the end mill is brought into engagement with the tool rest and the table is adjusted toward the grinding wheel until the tool just touches it. The motor is started and the table is traversed from left to right bringing the tool across the grinding wheel and off of the tool rest. The table and tool rest as a unit are then rocked laterally to cause the tool to clear the grinding wheel. The table then is moved forward or to the right to the starting position for the grinding operation on the next tooth and the table is rocked back to grinding position by spring 46 and this sequence of steps is followed until all of the teeth on the end mill have thus been ground. The foregoing has dealt with the grinding of the primary clearance as a first step but this is not necessarily followed since the secondary clearance may be ground first. Some tools, of course, may be ground with only the primary clearance. Regardless of which clearance may be ground, the table will be raised or lowered to accommodate the position of the grinding wheel in the manner and to the extent above described. Fig. 41 shows the resulting grinding of a 5° primary clearance at 241 and a 10° secondary clearance at 242.

Some end mills have diameters that are not greater than the diameter of the shanks or, in the case of small diameter tools, have tooth or flute depths which are less than the thickness of a tool rest such as shown at 200 and for such tools a tool rest such as shown in Figs. 30, 31 and 42 may be employed. To achieve the correct clearance angle on the teeth, it is essential that the teeth contact the grinding wheel at the intersection of the face of the wheel with a horizontal plane which is substantially coincident with the intersection of the axial line of the wheel with the plane of the face of the wheel. Since the tool rest is disposed outside of the wheel, it must either be in the said horizontal plane to support a straight toothed tool or it must be above said plane to correctly position a tool having helical teeth or the equivalent. Such angular teeth are usually at either 30° or 45° angles and the gauge 226 is provided with sloping faces 240 and 240' at the respective angles. The vertical adjustment of the table having been made as above described, the gauge is brought into engagement with the wheel (see Fig. 38) with the lower end of the appropriate sloping face just touching the outside diameter of the wheel. The tool rest supporting means is then adjusted vertically until the top edge of the blade 225 is just even with the sloping face of the gauge. Thus, the tooth being guided on the tool rest will contact the wheel at the correct position thereon.

If the cutter is tapered, the setup operation for griding the side teeth will include the adjustment of the work head about the stud 114. If extreme accuracy is not required, the setting may be achieved directly manually by reference to the quadrant scale 119 on the rear face of the work head pad 87 or through rotation of the screw 132. If the angle must be determined with great accuracy, reference is had to the taper-sine formula shown at the bottom of the indicia plate 233 in which it is noted that the formula is 2.3 × the sine of the desired angle. For convenience, the sine values for the more commonly used angles are contained in a tabulation on this plate. The value thus obtained is the amount in inches which is added to or subtracted from the distance between the member 133 and pin 134 when the work head is positioned at the zero point on the scale 119. By way of example, assuming that at the said zero position the distance between the outer faces of the member 133 and pin 134 was 2.500" and that the tool to be ground had an included angle of 15° converging toward the distal end thereof, the taper between the axial line of the tool and the side thereof would be 7° 30'. The sine of that angle is .1305 and this multiplied by the constant of 2.3 is .300 and therefore this amount in inches would be added to 2.500" giving a setting of 2.800" to correctly position the work head at the required angle. It is to be understood that the foregoing is by way of example only and other models and/or sizes of the machine might employ constant values other than those above used. The important factor to be noted is that there is provided means for quick, approximate setting and for extremely accurate setting of the work head for angular and straight cutters.

In grinding milling cutters, the cutters are mounted on appropriate stub arbors having cylindrical shanks engageable in a collet in the work head.

*Alternative set-ups*

An arrangement for grinding very small cutters is shown in Fig. 48. In the arrangement, the spring collet 104 is replaced by a solid collet-like member 244 which is similarly held in the sleeve 95 by the nut 106, said member 244 supporting a freely rotatable spindle 245 mounted in ball bearings 246 and 247 in the front and rear ends of the member 244. Forward of the bearing 246, the spindle 245 is provided with an axially aligned socket 248 having a setscrew 249 in which the shank S of a tool T is secured. For tools with a smaller shank, appropriate bushing or collet means may be interposed. Rearwardly of the member 244 the spindle terminates in a knurled hand grip portion 250. A collar 251 engages the rear face of the bearing 247 and a shoulder 252 on the socket portion 248 engages the front face of the bearing 246 to secure the spindle against endwise movement. When the spindle 245 is thus employed for supporting a tool, the sleeve 95 may be secured against rotative movement by the clamp screw 110 bearing against the ring 109. This means provides a very freely rotating movement to the spindle 245 and a consequent more sensitive "feel" of the tool incident to grinding.

Figs. 43 and 44 illustrate the grinding of a beveled or chamfered end on a reamer or other toothed tool of comparable configuration. For this operation, the work head is removed from the stud 114 and is secured on an auxiliary plate 253 having adjacent one end thereof an upwardly extending stud portion 254 which engages the bore 115 of the work head. The opposite end 255 of the plate 253 is curved about the axis of a bore 256 formed in a boss 257 on the top surface of the plate and extending through the plate for engagement with a stud 258 similar to the stud 114 but disposed at the opposite end of the table, said end 255 of the plate carrying a quadrant scale 255a which registers with a reference mark 255b on the table 41 to position the plate 253 at any desired angle to the line of movement of the table past the grinding wheel. A thumb screw 258a threadedly engaging the stud 258 serves to secure the plate 253 on the table in any desired angle as, for instance, the 45° angle shown in Fig. 43 for grinding a chamfer on a reamer R. The positioning of the reamer in the work head in proper relation to the indexing ring and the adjustment of the machine to the reamer follows the procedure previously described and need not be repeated. The table traverse in this and similar operations is usually effected by the rack and gear means previously described.

All of the foregoing relates to the grinding of right hand cutters and reamers. For left hand cutters, the work head is mounted on the stud 258 and the direction of the motor and grinding wheel is reversed. The adjustment of the machine and the locating of the tool in the work head relative to the indexing means follows the course previously described but at the oppoiste side of the grinding wheel, the tool rest, if used, being also located at the downwardly moving side of the grinding wheel. The range of the machine may be further increased by providing the plate 253 with a second bore 259 parallel to the bore 256 but closer to the end 255 whereby the plate and work head may be mounted on the stud 258 at a different distance from the centerline of the stud 114, the table being then held against rocking by the screw 48.

Referring finally to Figs. 46 and 47, there is shown a form of tool rest 260 intended primarily for the peripheral teeth of a milling cutter including a shank portion 260' disposed in a horizontal groove 261 on the front face of a guard member 262 and having a slot 263 formed therein through which a screw 264 extends to secure the tool rest in adjusted positions in a direction parallel to the front face of the grinding wheel. The guard 262 includes a slotted shank portion 265 extending at right angles to the groove 261 and through which a screw 266 extends to secure the guard in adjusted positions parallel to the axis of the spindle. The adjustable mounting of the tool rest enables it to be adjusted closely to the corner of the grinding wheel as it is altered by wear and dressing and the mounting on the guard being effective to maintain it at the correct height regardless of changes in elevation of the grinding wheel. The tooth contacting face 267 slopes downwardly from a high point which is located at the point at which grinding of the tool is performed by the grinding wheel, the angle of the slopes (see Fig. 46a) being slightly greater than the axis rake of the teeth on the periphery of milling cutters. It will be noted that the adjustment of the table horizontally toward and from the grinding wheel is independent of the tool rest. In use, it is not necessary to rock the table and it may be locked by the screw 48. The machine having been adjusted for the cutter to be ground by vertically adjusting the table to bring the face 229 of gauge 226 level with the high point of the tool rest 260, in the manner above described, the table is moved from right to left to grind one tooth and when the tooth clears the rest 260, the cutter is rotated until the next tooth engages the rest and the table moved from left to right until the tooth clears the tool rest and is then rotated to the next tooth and so on. If the cutter has straight teeth, the high point on the face of the tool rest will serve to position it correctly. If the teeth are staggered, i.e., arranged alternately at equal but opposite angles, the two sloping faces will accommodate the cutter teeth, it being understood that the tool rest faces will be disposed at the angles of the cutter teeth for this purpose. For straight tooh cutters, a straight faced tool rest may be used.

Thus, the primary objective of the invention is achieved in the provision of a tool grinding machine which is so constructed and arranged that practically all of the accommodations for the "grinding geometry" of the tools has been embraced by the various adjustments of the machine with the result that except for certain accommodations for some tapered cutters, resort to calculations is eliminated. Having achieved this primary objective, all of the other objectives have been achieved as well.

The machine is simple to operate and does not require a specially trained operator to produce properly ground tools and therefore, it is a machine which can be used to advantage in shops in which there is not enough tool sharpening to require a full time tool grinder since by the use of the machine of this invention, each machine tool operator can sharpen the tools he happens to be using. The machine has the further advantage of being quickly adjusted, it taking, on the average, about three minutes to change it from a set-up for one tool to a set-up for a different one. This saving of time results in important reductions in the down time of machine tools while the cutters therefor are being sharpened. It will be understood that the specific examples of setting up the machine for specific tools above described are by way of example only and that the specific presently preferred embodiment of the invention disclosed is also by way of example.

With these considerations in mind, it will be understood that the invention is not to be deemed to be limited to the exact embodiment so disclosed and that the invention embraces all such changes and modifications in the parts and in the construction, combination and arrangement of parts as shall come within the purview of the appended claims.

I claim:

1. In a machine for grinding the teeth of tools such as milling cutters and end mills, a frame structure, a rotatable spindle, a cup type grinding wheel mounted on one end of said spindle, a member in which said spindle is journaled, a motor operatively connected to said spindle and mounted on said member, means freely pivotally mounting said member on said frame structure for movement about an axis transverse to the axis of said spindle, stop means engageable with said member effective by resistance to the combined weight of said motor and said member to locate said member in a selected one of a plurality of predetermined angular positions with consequent positioning of the face of the grinding wheel at a predetermined angle, and other means carried by said frame structure effective to support a tool to be ground by the grinding wheel and including adjusting devices operable to bring the tool into grinding engagement with a desired portion of the grinding wheel surface, other devices operable to effect the traverse of the tool past the portion of the grinding wheel contacted thereby, and other devices operable to position successive teeth of the tool for similar contact with and traverse past the grinding wheel.

2. In a machine for grinding the teeth of tools such as milling cutters and end mills, a frame structure, a rotatable spindle adapted to carry a cup type grinding wheel on one end thereof, a bearing member in which said spindle is journaled, power means connected to drive said spindle, means freely pivotally mounting said member on said frame structure for movement about a horizontal axis transverse to the axis of said spindle, means operable to position said member in any selected one of a plurality of predetermined angular positions about the axis of said pivotal mounting with consequent positioning of the end face of a grinding wheel carried by said spindle at a selected one of a corresponding plurality of predetermined angles to the vertical, and means carried by said frame structure operable to hold a tool with a tooth thereof disposed in grinding engagement with a desired portion of the grinding wheel surface and for causing the tool to be traversed along the grinding wheel for the length of the tooth so engaged and including means operable to position successive teeth of the tool for similar engagement with the grinding wheel.

3. In a machine for grinding the teeth of tools such as milling cutters and end mills, a frame structure, a rotatable spindle adapted to carry a cup type grinding wheel on one end thereof, a bearing member in which said spindle is journaled, power means connected to drive said spindle, means freely pivotally mounting said member on said frame structure for movement about a horizontal axis transverse to the axis of said spindle and disposed adjacent to said one end of said spindle, means disposed at the side of said pivotal mounting opposite said one end of said spindle operable to position said member in any selected one of a plurality of predetermined angular positions about the axis of said pivotal mounting with consequent positioning of the end face of a grinding wheel caried by said spindle at a selected one of a corresponding plurality of predetermined angles to the vertical, and means carried by said frame structure operable to hold a tool with a tooth thereof disposed in grinding engagement with a desired portion of the grinding wheel surface and for causing the tool to be traversed along the grinding wheel for the length of the tooth so engaged and including means operable to position successive teeth of the tool for similar engagement with the grinding wheel.

4. In a machine for grinding the teeth of tools such as milling cutters and end mills, a frame structure, a rotatable spindle adapted to carry a cup type grinding wheel on one end thereof, a bearing member in which said spindle is journaled, said bearing member being freely pivotally mounted on said frame structure for movement about a horizontal axis transverse to the spindle axis and disposed at a point on said member adjacent to said one end of said spindle, a motor mounted on said bearing member and operatively connected to the other end of said spindle, an adjustable stop means carried by said frame structure and engageable with means on said bearing member disposed between said pivotal mounting and said other end of said spindle effective to hold said bearing member and spindle inclined downwardly toward the grinding wheel carrying end thereof at a selected one of a plurality of predetermined angles, the weight of said motor and of said bearing member in rear of said pivotal mounting being sufficient to maintain it in engagement with said stop means and consequently in the said selected predetermined angular position with consequent positioning of the end face of a grinding wheel carried by said spindle at a selected one of a corresponding plurality of predetermined angles to the vertical, and means carried by said frame structure operable to hold a tool with a tooth thereof disposed in grinding engagement with a desired portion of the grinding wheel surface and for causing the tool to be traversed along the grinding wheel for the length of the tooth so engaged and including means operable to position successive teeth of the tool for similar engagement with the grinding wheel.

5. A tool grinding machine as claimed in claim 4 in which said adjustable stop means includes a shaft journaled in a portion of said frame structure horizontally spaced from and adjacent to said bearing member and a cam member carried by said shaft having at least two peripherally spaced notches disposed at different radial distances from the axis of the shaft, and in which said means on said bearing member comprises a roller positioned to engage one or the other of said notches when said shaft is rotated to position the selected notch substantially vertically above the axis of said shaft, the engagement of said roller with the selected one of said notches being maintained by the weight of said motor and bearing member and the distances of said notches from the axis of said shaft being such as to position said spindle and the grinding wheel to grind related primary and secondary clearance angles on the portions of the teeth of a tool which extend generally in the direction of the axis of the tool.

6. A tool grinder as claimed in claim 5 in which a plurality of said cams are employed selectively and are interchangeably mounted on said shaft.

7. A tool grinder as claimed in claim 5 in which said shaft is shiftable axially to and from a cam carrying position and another position in which it is retracted out of the path of said cam engaging means on said bearing member, and in which movement of said shaft to said retracted position allows said bearing member to be moved to a substantially horizontal position for tool grinding operations employing the peripheral surface of the grinding wheel.

8. A tool grinding machine as claimed in claim 6 in which each of said cams is provided with a plurality of pairs of notches for positioning said bearing member and spindle at required angles whereby the grinding wheel may form primary and secondary clearances at selected angles on the portions of the teeth of tools which extend generally in the direction of the tool axis, and in which the machine carries a chart from which the proper cam and the pair of notches thereon for a specified diameter of tool and desired clearances may be ascertained.

9. In a machine for grinding the teeth of tools such as milling cutters and end mills, a frame structure, a rotatable spindle adapted to carry a cup type grinding wheel at one end thereof, bearing means for said spindle freely pivotally mounted on said frame structure, confining movement of said bearing means about an axis extending at right angles to a vertical plane containing the axis of said spindle, means for holding said bearing means at any selected one of a plurality of predetermined positions on said pivotal mounting with resultant location of the end face of a grinding wheel on said spindle at a corresponding desired angle to the vertical for operation on the tooth of a tool moved into engagement therewith, and tool supporting means carried by said frame structure and disposed in close adjacency to the end face of the grinding wheel carrying end of said spindle and including a table mounted for free reciprocation in a line parallel to the axis of said pivotal mounting of said bearing member, a tool holding means carried by said table, and adjusting means for said table including means for adjusting said table horizontally in a line parallel to a vertical plane containing the axis of rotation of said spindle.

10. In a machine for grinding the teeth of tools such as milling cutters and end mills, a frame structure, a rotatable spindle mounted on said frame structure and having one end thereof adapted to carry a cup type grinding wheel, and a tool supporting means carried by said frame structure and disposed in close adjacency to said one end of said spindle and including a table having a tool holding means mounted thereon, a supporting means for said table and on which said table is guided for reciprocation in a line parallel to the end face of a grinding wheel on said spindle, and means for rocking said table about an axis extending parallel to said line of reciprocation of said table.

11. In a machine for grinding the teeth of tools such as milling cutters and end mills, a frame structure, a rotatable spindle having one end thereof adapted to carry a cup type grinding wheel, a bearing means for said spindle pivotally mounted on said frame structure for movement about an axis disposed at right angles to the axis of said spindle, means for selectively moving said bearing means about said pivotal mounting to a desired one of a plurality of predetermined positions with resultant positioning of the face of a grinding wheel on said spindle at a desired angle to the vertical, and a tool supporting means carried by said frame structure and disposed in close adjacency to said one end of said spindle and including a table having tool holding means thereon, a supporting means for said table end on which said table is guided for reciprocation in a line parallel to the axial line of said pivotal mounting of said bearing means, and a pivotal support for said table supporting means and on which said table supporting means and said table may be rocked about an axis extending parallel to the line of reciprocation of said table.

12. In a machine for grinding the teeth of tools such as milling cutters and end mills, a frame structure, a rotatable spindle mounted on said frame structure and having one end thereof adapted to carry a cup type grinding wheel, a tool supporting means carried by said frame structure and disposed in close adjacency to said one end of said spindle and including a tool holding instrumentality, a table supporting said instrumentality and mounted for reciprocation in a line normal to a vertical plane containing the axis of said spindle and for rocking movement about an axis extending parallel to said line, and adjusting means for said tool supporting means including devices operable to adjust said table vertically and other devices operable to adjust said table to an infinite number of fixed positions along a horizontal line parallel to said vertical plane.

13. In a machine for grinding the teeth of tools such as milling cutters and end mills, a frame structure, a rotatable spindle adapted to carry a cup type grinding wheel at one end thereof, a bearing means for said spindle pivotally mounted on said frame structure for movement about an axis disposed at right angles to the axis of said spindle, means for selectively moving said bearing means about the axis of said pivotal mounting to a desired one of a plurality of predetermined with resultant positioning of the face of a grinding wheel carried by said spindle at a desired angle to the vertical, and a tool supporting means carried by said frame structure and disposed in close adjacency to said one end of said spindle and including a table having a tool engaging means thereon, a supporting means for said table and on which said table is mounted for reciprocation in a line parallel to the axial line of said pivotal mounting for said bearing means, a pivotal support for said table about which said table may be rocked about an axis extending parallel to the line of reciprocation of said table, devices operable to adjust said table vertically, and other devices operable to adjust said table to an infinite number of fixed positions along a line at right angles to the line of reciprocation of said table.

14. In a machine for grinding the teeth of tools such as milling cutters and end mills, a frame structure, a rotatable spindle adapted to carry a cup type grinding wheel at one end thereof, a bearing means for said spindle pivotally mounted on said frame structure for movement about an axis disposed at right angles to the axis of said spindle, means for selectively moving said bearing means about the axis of said pivotal mounting to a desired one of a plurality of predetermined with resultant positioning of the face of a grinding wheel carried by said spindle at a desired angle to the vertical, and a tool supporting means carried by said frame structure and disposed in close adjacency to said one end of said spindle and including a table having a tool engaging means thereon, a supporting means for said table and on which said table is mounted for reciprocation in a line parallel to the axial line of said pivotal mounting for said bearing means, a pivotal support for said table about which said table may be rocked about an axis extending parallel to the line of reciprocation of said table, and devices for adjustably positioning said table relative to a grinding wheel mounted on said one end of said spindle including a knee mounted for vertical adjustment on said frame structure, means for adjusting said knee vertically, a saddle slidably mounted on said knee, means for moving said saddle on said knee in a horizontal line at right angles to the line of reciprocation of said table.

15. In a machine for grinding the teeth of tools such as milling cutters and end mills, a frame structure, a rotatable spindle adapted to carry a cup type grinding wheel on one end thereof, a bearing means in which said spindle is journaled, means disposed in a horizontal line intersecting the axis of said spindle at a point adjacent to said one end thereof freely pivotally mounting said bearing means on said frame structure, an adjustable stop means including interengageable elements on said bearing member and said frame structure each effective to support said bearing member inclined downwardly toward said one end thereof at a selected one of a selected plurality of predetermined angular positions determined by the position of the selected one of said interchangeable elements, and tool supporting means carried by said frame structure and disposed in close adjacency to said one end of said spindle and including a table mounted for reciprocation in a line parallel to the axis of said pivotal mounting, a tool holding means carried by said table, and table supporitng means carried by said frame structure and including devices operable to adjust said table vertically; the said location of said pivotal mounting relative to said one end of said spindle allowing a wide range of angular positions of said spindle with minimum bodily vertical movement of said one end of said spindle and of a grinding wheel mounted thereon with resultant decrease in the extent of vertical adjustment required for said table supporting means to accommodate a change in the vertical position of said grinding wheel deriving from a change of said interchangeable elements or in the position of the one of said interchangeable elements then employed.

16. In a machine for grinding the teeth of tools such as milling cutters and end mills, a frame structure, a rotatable spindle adapted to carry a cup type grinding wheel on one end thereof, a bearing means in which said spindle is journaled, means disposed in a horizontal line intersecting the axis of said spindle at a point adjacent to said one end thereof freely pivotally mounting said bearing means on said frame structure, an adjustable stop means including interengageable elements on said bearing member and said frame structure effective to support said bearing member inclined downwardly toward said one end in a selected one of a plurality of predetermined angular positions about the axis of said pivotal mounting determined by the position of the selected one of said interchangeable elements, and a vertically adjustable tool supporting means carried by said frame structure and disposed in close adjacency to said one end of said spindle; the said location of said pivotal mounting means relative to said one end of said spindle allowing a wide range of angular movement of said spindle with a greatly reduced bodily vertical movement of said one end and of a grinding wheel carried thereby with resultant decrease in the extent of vertical adjustment required for said table supporting means to accommodate a change in the vertical position of said grinding wheel deriving from a change in position of the interchangeable element then being used or deriving from a replacement of one interchangeable element with another.

17. A tool grinding machine as claimed in claim 16 in which said stop means includes a shaft journaled in a portion of said frame structure horizontally spaced from and adjacent to said bearing means, a cam member carried by said shaft and having at least two peripherally spaced notches disposed at different radial distances from the axis of said shaft, and a member on said bearing means engageable with one or the other of said notches when the engaged notch is positioned vertically above the axis of said shaft; the distances of said notches from the axis of said shaft being such as to position said spindle at respective angles at which the end face of a grinding wheel carried thereby will be positioned to grind related primary and secondary clearances on the portions of the teeth of a tool mounted on said tool supporting means which extend generally in the direction of the axis of the tool.

18. A tool grinding machine as claimed in claim 17 in which a plurality of cams are employed selectively and are interchangeably mounted on said shaft.

19. A tool grinding machine as claimed in claim 17 in which said shaft is shiftable axially to and from a cam carrying position and another position in which it is retracted out of the path of said cam notch engaging means on said bearing means, and in which movement of said shaft to said retracted position allows said bearing member and said spindle to occupy a substantially horizontal position for tool grinding operations employing the periphery of the grinding wheel.

20. In a machine for grinding the teeth of tools such as milling cutters and end mills, a frame structure, a rotatable spindle mounted on said frame structure and having one end thereof adapted to carry a cup type grinding wheel, a tool supporting means carried by said frame structure and disposed in close adjacency to said one end of said spindle and including a table having a tool holding means mounted thereon, a table supporting element upon which said table is mouned for reciprocation in a path extending a right angles to the axial line of said spindle, a base upon which said table supporting element and said table are mounted for rocking movement as a unit about an axis extending parallel to the path of reciprocation of said table, a tool rest means mounted on said table supporting means and rockable therewith and including a tool tooth engaging element normally disposed in close adjacency to the juncture of the end face and side surface of a grinding wheel carried by said spindle, means constantly tending to rock said table together with said table supporting means and said tool rest in a direction to move said tool tooth engaging element toward the grinding wheel, stop means effective to limit the extent of said rocking movement in said one direction, and manually operable means for rocking said table, table supporting means and tool rest in the opposite direction.

21. A grinding macihne as claimed in claim 20 in which said tool rest comprises a vertically adjustable support and selectively interchangeable head elements detachably mounted on said support and adapted to be poistioned parallel to the grinding wheel end face or at right angles to said end face.

22. A grinding machine as claimed in claim 20 in which said tool rest includes a tool tooth engaging element disposed at the helical angle of the tooth of a cutter to be ground on the machine.

23. A grinding machine as claimed in claim 20 in which said means constantly tending to rock said table toward the grinding wheel comprises spring means and in which adjustable abutment means are interposed between said table and said table supporting means operative to be positioned to prevent rocking movement of said table in opposition to said spring means.

24. In a machine for grinding the teeth of tools such as milling cutters and end mills, a frame structure, means for supporting and driving a cup type grinding wheel on said frame structure, and means for supporting a tool and for moving it relative to the grinding wheel carried by said frame structure, said tool supporting means including a table carrying a tool holding means and having depending, parallel spaced opposed grooves extending longitudinally thereof, a table supporting element carried by said frame structure disposed beneath said table and having a pair of substantially vertical studs each carrying a roller having the outer peripheral face thereof engaging one of said grooves at spaced points and further having a second pair of substantially vertical studs each carrying a roller engaging the other of said grooves at spaced points, and means for effecting relative lateral adjusting movement between said rollers and said spaced parallel grooves with resultant elimination of all play there between; the engagement between said rollers and said grooves forming a raceway for the free reciprocation of said table on said table supporting element.

25. A grinding machine as claimed in claim 24 in which the rollers engaging portions of one of said pairs of studs is eccentrically disposed with respect to the portion thereof which engages said table supporting element whereby rotation of said one pair of studs will effect relative lateral movement of the rollers carried thereby with consequent elimination of play between said rollers and said grooves.

26. A grinding machine as claimed in claim 25 in which pairs of studs are slightly upwardly divergent and in which said rollers are ball bearing assemblies whereby upon said rotative adjustment of said one pair of studs, the ball bearing races of said assemblies carried by all of said studs will be canted slightly with elimination of any axial play in the ball bearing assemblies and resultant elimination of play in both vertical and lateral horizontal directions in the table.

27. In a machine for grinding the teeth of tools such as milling cutters and end mills, a frame structure, a rotatable spindle adapted to carry a cup type grinding wheel at one end thereof mounted on said frame structure, and a tool supporting means carried by said frame structure and disposed adjacent to a grinding wheel carried by said spindle and including a table carrying a tool holding means, a supporting means for said table on which said table is guided for reciprocation in a line parallel to the end face of the grinding wheel, and screw threaded means interconnecting said table and said table supporting means manually operable to move said table positively in either direction in said line and to hold said table against movement in any position to which it is moved by said screw threaded means; said screw threaded means including a nut element mounted on said table with the axial line thereof extending parallel to the line of reciprocation of said table, the mounting of said nut on said table permitting free rotation of the nut and preventing endwise movement relative to said table, a rod having a threaded end engaging said nut and extending in said line, and a manually operable clamp screw carried by said table supporting means operable to clamp said rod against movement and rotation with resultant holding of said table against reciprocal movement except upon rotation of said nut element.

28. In a machine for grinding the teeth of tools such as milling cutters and end mills, a frame structure, a rotatable spindle adapted to carry a grinding wheel mounted on said frame structure, means affording selective predetermination of the angle of said spindle to the horizontal, a tool supporting table mounted on said frame structure with capacity for reciprocable movement in a line extending at right angles to a vertical plane containing the axis of said spindle, means for adjusting the position of said table vertically, other means for adjusting the position of said table horizontally in a line extending parallel to said vertical plane, and a tool holding instrumentality carried by said table including a draw collet engageable with the shank of a tool to be ground, means for actuating said collet to engage and release a tool shank, a sleeve in which said collet and actuating means is mounted, and a base member secured to said table and in which said sleeve is journaled for rotation.

29. A tool grinding machine as claimed in claim 28 in which said spindle is mounted in a bearing member in which said bearing member is pivotally mounted on said frame structure for movement about an axis parallel to said line of reciprocable movement of said table to a selected one of a plurality of predetermined positions at an acute angle to the horizontal, and in which said spindle is adapted to carry a cup type grinding wheel at one end thereof.

30. A tool grinding machine as claimed in claim 28 in which said base member is secured to said table by vertically disposed screw threaded means and in which said base member and said table carry juxtaposed graduations and a reference mark whereby said base member may be positioned on said table with the axis of said sleeve disposed in a vertical plane at an acute angle to a vertical plane extending parallel to said line of reciprocable movement of said table.

31. A tool grinding machine as claimed in claim 28 in which said sleeve carries a ring mounted against axial movement thereon and secured by releasable means against relative rotative movement, said ring having a plurality of rows of radially extending holes, and each of said rows having a different number of said holes than any of the others of said rows, and in which said base member carries a spring biased plunger means engageable with said holes and movable parallel to the axis of said sleeve into registry with a selected one of said rows.

32. In a machine for grinding the teeth of tools such as milling cutters and end mills, a frame structure, a rotatable spindle adapted to carry a grinding wheel mounted on said frame structure, a tool supporting table mounted on said frame structure with capacity for reciprocable movement in a line extending at right angles to a vertical plane containing the axis of said spindle, and a tool holding instrumentality carried by said table including a draw collet engageable with the shank of a tool to be ground, means for actuating said collet to engage and release a tool shank, a sleeve in which said collet and actuating means is mounted, and a base member secured to said table and in which said sleeve is journaled; said spindle being mounted in a bearing member, said bearing member being pivotally mounted on said frame structure for movement about an axis parallel to said line of reciprocable movement of said table to a selected one of a plurality of predetermined positions at an acute angle to the horizontal, and said spindle being adapted to carry a cup type grinding wheel at one end thereof.

33. A tool grinding machine as claimed in claim 32 in which said base member is secured to said table by vertically disposed screw threaded means and in which said base member and said table carry juxtaposed graduations and a reference mark whereby said base member may be positioned about the axis of said screw threaded securing means on said table with the axis of said sleeve disposed in a vertical plane at a selected acute angle to a vertical plane extending parallel to said line of reciprocable movement of said table.

34. A tool grinding machine as claimed in claim 32 in which said sleeve carries a ring mounted against axial movement thereon and secured by releasable means against relative rotative movement, said ring having a plurality fo rows of radially extending holes, and each of said rows having a different number of said holes than any of the others of said rows, and in which said base member carries a spring biased plunger means engagable with said holes and movable parallel to the axis of said sleeve into registry with a selected one of said rows.

35. A tool grinding machine as claimed in claim 32 in which said base member is provided with manually operable clamp means for locking said sleeve against rotation therein.

References Cited in the file of this patent
UNITED STATES PATENTS

| | | |
|---|---|---|
| 1,643,089 | Ray et al. | Sept. 20, 1927 |
| 1,662,078 | Severson | Mar. 13, 1928 |
| 1,975,947 | Isler et al. | Oct. 9, 1934 |
| 1,981,174 | Hille | Nov. 20, 1934 |
| 2,286,970 | Maynard | June 16, 1942 |
| 2,362,873 | Wessman | Nov. 14, 1944 |
| 2,624,983 | Rink | Jan. 13, 1953 |
| 2,787,094 | French | Apr. 2, 1957 |